US012726385B2

(12) United States Patent
Patchava et al.

(10) Patent No.: US 12,726,385 B2
(45) Date of Patent: Sep. 1, 2026

(54) MULTI-ANTENNA READER CHANNEL STATE INFORMATION ACQUISITION

(71) Applicant: QUALCOMM Incorporated, San Diego, CA (US)

(72) Inventors: Raviteja Patchava, San Diego, CA (US); Piyush Gupta, Bridgewater, NJ (US); Xiaoxia Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 841 days.

(21) Appl. No.: 18/159,078

(22) Filed: Jan. 24, 2023

(65) Prior Publication Data

US 2024/0250852 A1 Jul. 25, 2024

(51) Int. Cl.

| | |
|---|---|
| ***H04L 25/02*** | (2006.01) |
| ***H04B 7/06*** | (2006.01) |
| ***H04L 5/00*** | (2006.01) |

(52) U.S. Cl.

CPC ....... *H04L 25/0224* (2013.01); *H04B 7/0626* (2013.01); *H04L 5/0048* (2013.01)

(58) Field of Classification Search

CPC .......... H04B 5/45; H04B 5/77; H04B 7/0626; H04L 25/0224; H04L 5/0048

See application file for complete search history.

(56) References Cited

U.S. PATENT DOCUMENTS 5,357,253 A * 10/1994 Van Etten ............... G01S 13/24 342/131
7,039,016 B1 * 5/2006 Lindskog .............. H04W 24/00 455/115.2

(Continued)

FOREIGN PATENT DOCUMENTS

WO WO-2022200673 A1 9/2022

OTHER PUBLICATIONS

Arnitz, D., et al., "Multitransmitter Wireless Power Transfer Optimization for Backscatter RFID Transponders", IEEE Antennas and Wireless Propagation Letters, IEEE, Piscataway, NJ, US, vol. 12, Jan. 1, 2013, pp. 849-852, XP011522316, Sections I-II.

(Continued)

*Primary Examiner* — Dung B Huynh
(74) *Attorney, Agent, or Firm* — Holland & Hart LLP

(57) ABSTRACT

Methods, systems, and devices for wireless communications are described. A network node may determine channel state information (CSI) for a link with an energy harvesting (EH)-capable device based on measurements of backscattered signals reflected from the EH-capable device. The network node may include multiple antennas and may indicate, to the EH-capable device, a frequency shift to be applied by the EH-capable device to backscattering. The network node may transmit reference signals from each antenna of the network node. The EH-capable device may backscatter the received reference signals in accordance (Continued)

with the indicated frequency shift, and the network node may measure the frequency-shifted backscattered responses to the reference signals to determine CSI between the different antennas and the EH-capable device. Based on the identified CSI, the network node may perform channel selection and/or spatial beamforming to increase received power at the EH-capable device for downlink transmissions to the EH-capable device.

28 Claims, 19 Drawing Sheets

(56) References Cited

U.S. PATENT DOCUMENTS

| | | | | |
|---|---|---|---|---|
| 7,636,573 | B2 * | 12/2009 | Walton | H04B 7/0689 455/454 |
| 8,243,834 | B2 * | 8/2012 | Kishigami | H04L 27/2695 375/267 |
| 9,929,460 | B1 * | 3/2018 | Broyde | H01Q 5/50 |
| 10,498,569 | B2 * | 12/2019 | Ganesan | H04L 27/04 |
| 11,201,709 | B2 * | 12/2021 | Jiang | H04L 5/0007 |
| 12,010,668 | B2 * | 6/2024 | Yerramalli | H04B 7/0888 |
| 12,418,379 | B2 * | 9/2025 | Xu | H04W 24/08 |
| 2005/0128141 | A1 * | 6/2005 | Howell | H04B 7/0408 342/372 |
| 2007/0290802 | A1 * | 12/2007 | Batra | G06K 7/0008 340/572.1 |
| 2008/0013638 | A1 * | 1/2008 | Walton | H04W 16/00 375/260 |
| 2010/0080112 | A1 * | 4/2010 | Bertrand | H04L 27/2657 370/344 |
| 2011/0305161 | A1 * | 12/2011 | Ekpenyong | H04L 5/001 370/252 |
| 2013/0181861 | A1 * | 7/2013 | Zohar | G01S 3/48 342/118 |
| 2013/0322869 | A1 * | 12/2013 | Hirth | H04Q 11/0067 398/16 |
| 2015/0229133 | A1 * | 8/2015 | Reynolds | H02J 7/0048 307/24 |
| 2017/0195998 | A1 * | 7/2017 | Zhang | H04B 7/06952 |
| 2017/0351886 | A1 * | 12/2017 | Recouly | G06K 7/10217 |
| 2017/0373892 | A1 * | 12/2017 | Ganesan | H04B 17/318 |
| 2018/0014254 | A1 * | 1/2018 | Hwang | H04W 72/0473 |
| 2018/0115357 | A1 * | 4/2018 | Park | H04W 72/00 |
| 2018/0146419 | A1 * | 5/2018 | Raghavan | H04W 48/16 |
| 2018/0234149 | A1 * | 8/2018 | Zhang | H04L 5/0048 |
| 2019/0120954 | A1 * | 4/2019 | Kim | G05D 1/0033 |
| 2019/0141666 | A1 * | 5/2019 | Luo | G01S 5/02213 |
| 2019/0327065 | A1 * | 10/2019 | Li | H04L 5/0051 |
| 2020/0100219 | A1 * | 3/2020 | Takeda | H04W 72/23 |
| 2020/0169318 | A1 * | 5/2020 | Kim | H04B 17/309 |
| 2020/0196174 | A1 * | 6/2020 | Liu | H04B 7/0645 |
| 2020/0212974 | A1 * | 7/2020 | Wu | H04B 7/0469 |
| 2020/0374013 | A1 * | 11/2020 | Jang | H04R 17/00 |
| 2020/0412591 | A1 * | 12/2020 | Lopez | H04B 5/45 |
| 2021/0083816 | A1 * | 3/2021 | Werner | H04L 5/0023 |
| 2021/0084251 | A1 * | 3/2021 | Gollakota | H04N 5/40 |
| 2021/0153084 | A1 * | 5/2021 | You | H04W 72/21 |
| 2021/0294993 | A1 * | 9/2021 | Sundaresan | G06K 7/10366 |
| 2021/0331312 | A1 * | 10/2021 | Kim | A47L 9/28 |
| 2021/0352681 | A1 * | 11/2021 | Jiang | H04W 16/14 |
| 2021/0368439 | A1 * | 11/2021 | Karimaruthumkal | H04L 5/0055 |
| 2021/0391899 | A1 * | 12/2021 | Cao | H04B 17/373 |
| 2022/0015067 | A1 * | 1/2022 | Li | H04W 72/0446 |
| 2022/0029871 | A1 * | 1/2022 | Zou | H04B 1/40 |
| 2022/0078649 | A1 * | 3/2022 | Chen | H04L 5/0057 |
| 2022/0116808 | A1 * | 4/2022 | Wang | H04W 24/08 |
| 2022/0225121 | A1 * | 7/2022 | Wanuga | H04W 16/28 |
| 2022/0286171 | A1 * | 9/2022 | Fara | H04W 52/46 |
| 2022/0404486 | A1 * | 12/2022 | Vagarappan Ulaganathan | G01S 13/88 |
| 2022/0417068 | A1 * | 12/2022 | Dai | H04L 27/22 |
| 2023/0028864 | A1 * | 1/2023 | Fan | H02J 50/20 |
| 2023/0035143 | A1 * | 2/2023 | Cirik | H04B 7/0413 |
| 2023/0066605 | A1 * | 3/2023 | Zhang | G01S 5/011 |
| 2023/0074373 | A1 * | 3/2023 | Jatunov | G01S 13/84 |
| 2023/0100617 | A1 * | 3/2023 | Kumari | G01S 7/006 342/58 |
| 2023/0134172 | A1 * | 5/2023 | Sun | H04L 5/0035 370/331 |
| 2023/0176207 | A1 * | 6/2023 | Kimionis | H04W 64/00 455/456.1 |
| 2023/0179239 | A1 * | 6/2023 | Lopez | H04B 1/0475 455/114.2 |
| 2023/0244883 | A1 * | 8/2023 | Nielsen | H04B 5/77 340/10.1 |
| 2023/0254886 | A1 * | 8/2023 | Gupta | H04W 72/542 370/329 |
| 2023/0261903 | A1 * | 8/2023 | Wei | H04L 25/0202 370/329 |
| 2023/0327714 | A1 * | 10/2023 | Baligh | H04B 7/088 375/262 |
| 2023/0337269 | A1 * | 10/2023 | Rao | H04B 7/088 |
| 2023/0353219 | A1 * | 11/2023 | Yu | H04B 17/318 |
| 2023/0362664 | A1 * | 11/2023 | Li | H04W 16/28 |
| 2023/0379684 | A1 * | 11/2023 | Bayesteh | H04W 8/005 |
| 2024/0056274 | A1 * | 2/2024 | Cirik | H04B 7/06968 |
| 2024/0063854 | A1 * | 2/2024 | Athley | H04L 5/0023 |
| 2024/0073882 | A1 * | 2/2024 | Yang | H01Q 3/46 |
| 2024/0106532 | A1 * | 3/2024 | Mahalingam | H04W 52/0229 |
| 2024/0146408 | A1 * | 5/2024 | Herath | H04J 11/00 |
| 2024/0151815 | A1 * | 5/2024 | Wang | G01S 7/4865 |
| 2024/0163840 | A1 * | 5/2024 | Säily | G01S 7/006 |
| 2024/0171269 | A1 * | 5/2024 | Xu | H04B 17/336 |
| 2024/0179031 | A1 * | 5/2024 | Delfeld | H04B 7/0617 |
| 2024/0179494 | A1 * | 5/2024 | Säily | H04W 4/029 |
| 2024/0179639 | A1 * | 5/2024 | He | H04W 52/146 |
| 2024/0179666 | A1 * | 5/2024 | Wang | H04W 4/80 |
| 2024/0185017 | A1 * | 6/2024 | Wang | G01S 13/755 |
| 2024/0187085 | A1 * | 6/2024 | Mcmenamy | H04B 7/15557 |
| 2024/0215067 | A1 * | 6/2024 | Elkotby | H04W 74/08 |
| 2024/0236784 | A1 * | 7/2024 | Henry | H04W 36/00837 |
| 2024/0250852 | A1 * | 7/2024 | Patchava | G06K 7/0008 |
| 2024/0259056 | A1 * | 8/2024 | Sun | H04B 7/0617 |
| 2024/0306236 | A1 * | 9/2024 | Huang | H04W 52/346 |
| 2024/0323901 | A1 * | 9/2024 | Dong | H04B 7/04013 |
| 2024/0333342 | A1 * | 10/2024 | Huang | H04B 7/0639 |
| 2024/0338550 | A1 * | 10/2024 | Frederick | G06K 7/10217 |
| 2024/0340706 | A1 * | 10/2024 | Huang | H04B 7/15528 |
| 2024/0348349 | A1 * | 10/2024 | Jiang | H04W 4/80 |
| 2024/0349229 | A1 * | 10/2024 | Jiang | G01S 7/006 |
| 2024/0357542 | A1 * | 10/2024 | Jiang | G01S 5/0218 |
| 2024/0372766 | A1 * | 11/2024 | Luo | H04L 27/2602 |
| 2024/0388382 | A1 * | 11/2024 | Huang | H04B 7/0456 |
| 2024/0396774 | A1 * | 11/2024 | Ma | H04L 5/0048 |
| 2024/0414569 | A1 * | 12/2024 | He | H04W 52/02 |
| 2025/0024273 | A1 * | 1/2025 | Vieira | H04B 7/024 |
| 2025/0030519 | A1 * | 1/2025 | Xu | H04L 25/0224 |
| 2025/0039727 | A1 * | 1/2025 | Cui | H04B 5/24 |
| 2025/0055528 | A1 * | 2/2025 | Muruganathan | H04B 7/0626 |
| 2025/0062793 | A1 * | 2/2025 | Bedewy | H01Q 3/46 |
| 2025/0062806 | A1 * | 2/2025 | Janjua | H04W 52/42 |
| 2025/0106082 | A1 * | 3/2025 | Kim | H04B 7/06 |
| 2025/0119883 | A1 * | 4/2025 | Liang | H04B 17/309 |
| 2025/0126572 | A1 * | 4/2025 | Cui | H04W 76/20 |
| 2025/0142541 | A1 * | 5/2025 | Cui | H04W 72/04 |
| 2025/0192869 | A1 * | 6/2025 | Huang | H04W 72/046 |
| 2025/0193644 | A1 * | 6/2025 | Shaban | H04L 5/0051 |
| 2025/0202534 | A1 * | 6/2025 | Elshafie | H04B 5/45 |
| 2025/0203356 | A1 * | 6/2025 | Elshafie | H04L 9/3247 |
| 2025/0212110 | A1 * | 6/2025 | Yang | H04L 5/0094 |
| 2025/0212205 | A1 * | 6/2025 | Cui | H04W 72/1263 |
| 2025/0287345 | A1 * | 9/2025 | Cui | H04W 72/20 |
| 2025/0300698 | A1 * | 9/2025 | Oh | H04B 7/04013 |
| 2025/0310954 | A1 * | 10/2025 | Oh | H04W 72/1268 |
| 2025/0323683 | A1 * | 10/2025 | Cui | H04B 5/45 |
| 2025/0323689 | A1 * | 10/2025 | Jagyasi | H04B 7/0626 |

(56) References Cited

U.S. PATENT DOCUMENTS

| | | | | |
|---|---|---|---|---|
| 2025/0324229 | A1* | 10/2025 | Barbu | H04W 8/005 |
| 2025/0343572 | A1* | 11/2025 | Elshafie | H04B 5/79 |
| 2025/0344177 | A1* | 11/2025 | Zhang | H04W 24/08 |

OTHER PUBLICATIONS

He S., et al., "C-Cube: Rethinking Distributed Beamforming for Concurrent Charging in Backscatter Networks", Proceedings of the Acm on Interactive, Mobile, Wearable and Ubiquitous Technologies, Acmpub27, New York, NY, USA, vol. 6, No. 4, Article 203, Jan. 11, 2023, Dec. 2022, XP058925710, Sections 1-4, p. 2-p. 15, pp. 1-26.

International Search Report and Written Opinion—PCT/US2024/010290—ISA/EPO—Apr. 25, 2024.

Yang G., et al., "Multi-Antenna Wireless Energy Transfer for Backscatter Communication Systems", IEEE Journal on Selected Areas in Communications, IEEE Service Center, Piscataway, US, vol. 33, No. 12, Dec. 1, 2015, pp. 2974-2987, XP011590336, Sections I, II, and III-A.

* cited by examiner

MULTI-ANTENNA READER CHANNEL STATE INFORMATION ACQUISITION

INTRODUCTION

The following relates to wireless communications associated with multi-antenna reader channel state information acquisition.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-antenna reader channel state information (CSI) acquisition. For example, the described techniques provide for determination of CSI at an interrogating device (e.g., a radio frequency identification (RFID) reader) based on measurements of backscattered signals reflected from an energy harvesting (EH)-capable device. A network node (e.g., the interrogating device) with multiple antennas may indicate, to the EH-capable device, a frequency shift to be applied by the EH-capable device to backscattering. The network node may transmit reference signals from each antenna of the network node. The EH-capable device may backscatter the received reference signals in accordance with the indicated frequency shift, and the network node may measure the frequency-shifted backscattered responses to the reference signals to determine CSI between the different antennas and the EH-capable device. Based on the identified CSI, the network node may perform channel selection and/or spatial beamforming to increase the received power at the EH-capable device for downlink transmissions to the EH-capable device. The frequency shift may enable the network node to identify the EH-capable device. The network node may transmit the reference signals using time division multiplexing (TDM), frequency division multiplexing (FDM), and/or code division multiplexing (CDM) techniques.

A method for wireless communications at a network node is described. The method may include transmitting a first reference signal via a first antenna and a second reference signal via a second antenna, receiving, from an EH-capable device, a first frequency-shifted backscatter response corresponding to the first reference signal and a second frequency-shifted backscatter response corresponding to the second reference signal, and transmitting, to the EH-capable device, a signal based on CSI, where the CSI is based on the first frequency-shifted backscatter response and the second frequency-shifted backscatter response.

A network node for wireless communications is described. The network node may include: a memory: and at least one processor coupled to the memory, where the at least one processor is configured to transmit a first reference signal via a first antenna and a second reference signal via a second antenna, receive, from an EH-capable device, a first frequency-shifted backscatter response corresponding to the first reference signal and a second frequency-shifted backscatter response corresponding to the second reference signal, and transmit, to the EH-capable device, a signal based on CSI, where the CSI is based on the first frequency-shifted backscatter response and the second frequency-shifted backscatter response.

Another apparatus for wireless communications at a network node is described. The apparatus may include means for transmitting a first reference signal via a first antenna and a second reference signal via a second antenna, means for receiving, from an EH-capable device, a first frequency-shifted backscatter response corresponding to the first reference signal and a second frequency-shifted backscatter response corresponding to the second reference signal, and means for transmitting, to the EH-capable device, a signal based on CSI, where the CSI is based on the first frequency-shifted backscatter response and the second frequency-shifted backscatter response.

A non-transitory computer-readable medium storing code for wireless communications at a network node is described. The code may include instructions executable by a processor to transmit a first reference signal via a first antenna and a second reference signal via a second antenna, receive, from an EH-capable device, a first frequency-shifted backscatter response corresponding to the first reference signal and a second frequency-shifted backscatter response corresponding to the second reference signal, and transmit, to the EH-capable device, a signal based on CSI, where the CSI is based on the first frequency-shifted backscatter response and the second frequency-shifted backscatter response.

In some examples of the method, apparatuses, and non-transitory computer-readable medium described herein, transmitting the first reference signal via the first antenna and the second reference signal via the second antenna may include operations, features, means, or instructions for time division multiplexing the first reference signal and the second reference signal.

In some examples of the method, apparatuses, and non-transitory computer-readable medium described herein, transmitting the first reference signal via the first antenna and the second reference signal via the second antenna may include operations, features, means, or instructions for frequency division multiplexing the first reference signal and the second reference signal.

In some examples of the method, apparatuses, and non-transitory computer-readable medium described herein, transmitting the first reference signal via the first antenna and the second reference signal via the second antenna may include operations, features, means, or instructions for code division multiplexing the first reference signal and the second reference signal.

In some examples of the method, apparatuses, and non-transitory computer-readable medium described herein, a first precoding vector may be associated with the first reference signal and the second reference signal.

Some examples of the method, apparatuses, and non-transitory computer-readable medium described herein may further include operations, features, means, or instructions for transmitting a third reference signal via the first antenna and a fourth reference signal via the second antenna, where a second precoding vector may be associated with the third reference signal and the fourth reference signal and receiving, from the EH-capable device, a third frequency-shifted backscatter response corresponding to the third reference signal and a fourth frequency-shifted backscatter response corresponding to the fourth reference signal, where the CSI may be based on the third frequency-shifted backscatter response and the fourth frequency-shifted backscatter response.

In some examples of the method, apparatuses, and non-transitory computer-readable medium described herein, transmitting the signal based on CSI may include operations, features, means, or instructions for transmitting the signal using one of the first precoding vector or the second precoding vector.

In some examples of the method, apparatuses, and non-transitory computer-readable medium described herein, transmitting the signal based on CSI may include operations, features, means, or instructions for determining, based on the CSI, a particular precoding vector to use to transmit the signal, where the particular precoding vector may be one of the first precoding vector or the second precoding vector.

Some examples of the method, apparatuses, and non-transitory computer-readable medium described herein may further include operations, features, means, or instructions for determining the CSI based on a respective strength for each of the first frequency-shifted backscatter response, the second frequency-shifted backscatter response, the third frequency-shifted backscatter response, and the fourth frequency-shifted backscatter response, where determining the particular precoding vector includes determining the particular precoding vector based on the respective strength for each of the first frequency-shifted backscatter response, the second frequency-shifted backscatter response, the third frequency-shifted backscatter response, and the fourth frequency-shifted backscatter response.

In some examples of the method, apparatuses, and non-transitory computer-readable medium described herein, the CSI includes first CSI based on the first frequency-shifted backscatter response and second CSI based on the second frequency-shifted backscatter response.

Some examples of the method, apparatuses, and non-transitory computer-readable medium described herein may further include operations, features, means, or instructions for transmitting a third reference signal via the first antenna via a second sub-band and a second time resource, where transmitting the first reference signal via the first antenna and the second reference signal via the second antenna includes transmitting the first reference signal via a first sub-band and a first time resource and the second reference signal via the second sub-band and the first time resource, transmitting a fourth reference signal via the second antenna via the first sub-band and the second time resource, and receiving, from the EH-capable device, a third frequency-shifted backscatter response corresponding to the third reference signal and a fourth frequency-shifted backscatter response corresponding to the fourth reference signal, where the CSI may be based on the third frequency-shifted backscatter response and the fourth frequency-shifted backscatter response.

Some examples of the method, apparatuses, and non-transitory computer-readable medium described herein may further include operations, features, means, or instructions for transmitting, to the EH-capable device, control information that may be indicative of a first frequency shift to apply to the first sub-band and to the second sub-band during the first time resource and a second frequency shift to apply to the first sub-band and to the second sub-band during the second time resource, where the first frequency-shifted backscatter response and the second frequency-shifted backscatter response may be received in accordance with the first frequency shift, and where the third frequency-shifted backscatter response and the fourth frequency-shifted backscatter response may be received in accordance with the second frequency shift.

Some examples of the method, apparatuses, and non-transitory computer-readable medium described herein may further include operations, features, means, or instructions for transmitting, to the EH-capable device, control information that may be indicative of a frequency shift to be applied to the first reference signal and the second reference signal, where receipt of the first frequency-shifted backscatter response and the second frequency-shifted backscatter response may be in accordance with the frequency shift.

Some examples of the method, apparatuses, and non-transitory computer-readable medium described herein may further include operations, features, means, or instructions for transmitting, to a second EH-capable device, second control information that may be indicative of a second frequency shift to be applied to the first reference signal and the second reference signal, receiving, from the second EH-capable device, a third frequency-shifted backscatter response corresponding to the first reference signal and a fourth frequency-shifted backscatter response corresponding to the second reference signal, where receipt of the third frequency-shifted backscatter response and the fourth frequency-shifted backscatter response may be in accordance with the second frequency shift, and transmitting, to the second EH-capable device, a second signal based on second CSI, where the second CSI may be based on the third frequency-shifted backscatter response and the fourth frequency-shifted backscatter response.

In some examples of the method, apparatuses, and non-transitory computer-readable medium described herein, the control information may be indicative of an identifier for the EH-capable device.

Some examples of the method, apparatuses, and non-transitory computer-readable medium described herein may further include operations, features, means, or instructions for selecting a first beam associated with the first reference signal based on the CSI, where the second reference signal may be associated with the second reference signal, and where transmission of the signal may be via the beam.

Some examples of the method, apparatuses, and non-transitory computer-readable medium described herein may further include operations, features, means, or instructions for transmitting, to the EH-capable device, control information indicating for the EH-capable device to apply a same reflection coefficient to the first reference signal and the second reference signal, where the CSI may be based on the same reflection coefficient.

A method for wireless communications at an EH-capable device is described. The method may include receiving, from a network node, control information including an indication of a frequency shift to apply to backscatter-modulation, receiving, from the network node, a first reference signal and a second reference signal, and backscattering the first reference signal and the second reference signal in accordance with the frequency shift.

An EH-capable device is described. The EH-capable device may include: a memory: and at least one processor coupled to the memory, where the at least one processor is configured to receive, from a network node, control information including an indication of a frequency shift to apply to backscatter-modulation, receive, from the network node, a first reference signal and a second reference signal, and backscatter the first reference signal and the second reference signal in accordance with the frequency shift.

Another apparatus for wireless communications at an EH-capable device is described. The apparatus may include means for receiving, from a network node, control information including an indication of a frequency shift to apply to backscatter-modulation, means for receiving, from the network node, a first reference signal and a second reference signal, and means for backscattering the first reference signal and the second reference signal in accordance with the frequency shift.

A non-transitory computer-readable medium storing code for wireless communications at an EH-capable device is described. The code may include instructions executable by a processor to receive, from a network node, control information including an indication of a frequency shift to apply to backscatter-modulation, receive, from the network node, a first reference signal and a second reference signal, and backscatter the first reference signal and the second reference signal in accordance with the frequency shift.

In some examples of the method, apparatuses, and non-transitory computer-readable medium described herein, the indication may be indicative of a same frequency shift to apply to the first reference signal and the second reference signal.

Some examples of the method, apparatuses, and non-transitory computer-readable medium described herein may further include operations, features, means, or instructions for receiving the first reference signal via a first sub-band and the second reference signal via a second sub-band, where the indication may be indicative of a first frequency shift to apply to reference signals received via a first sub-band and a second frequency shift to apply to reference signals received via a second sub-band.

In some examples of the method, apparatuses, and non-transitory computer-readable medium described herein, receiving the control information may include operations, features, means, or instructions for receiving an identifier for the EH-capable device.

In some examples of the method, apparatuses, and non-transitory computer-readable medium described herein, receiving the control information may include operations, features, means, or instructions for receiving an indication to apply a same reflection coefficient to the first reference signal and the second reference signal.

Some examples of the method, apparatuses, and non-transitory computer-readable medium described herein may further include operations, features, means, or instructions for receiving, from the network node, a signal based on the backscattered first reference signal and the backscattered second reference signal.

DETAILED DESCRIPTION

Figure 1:
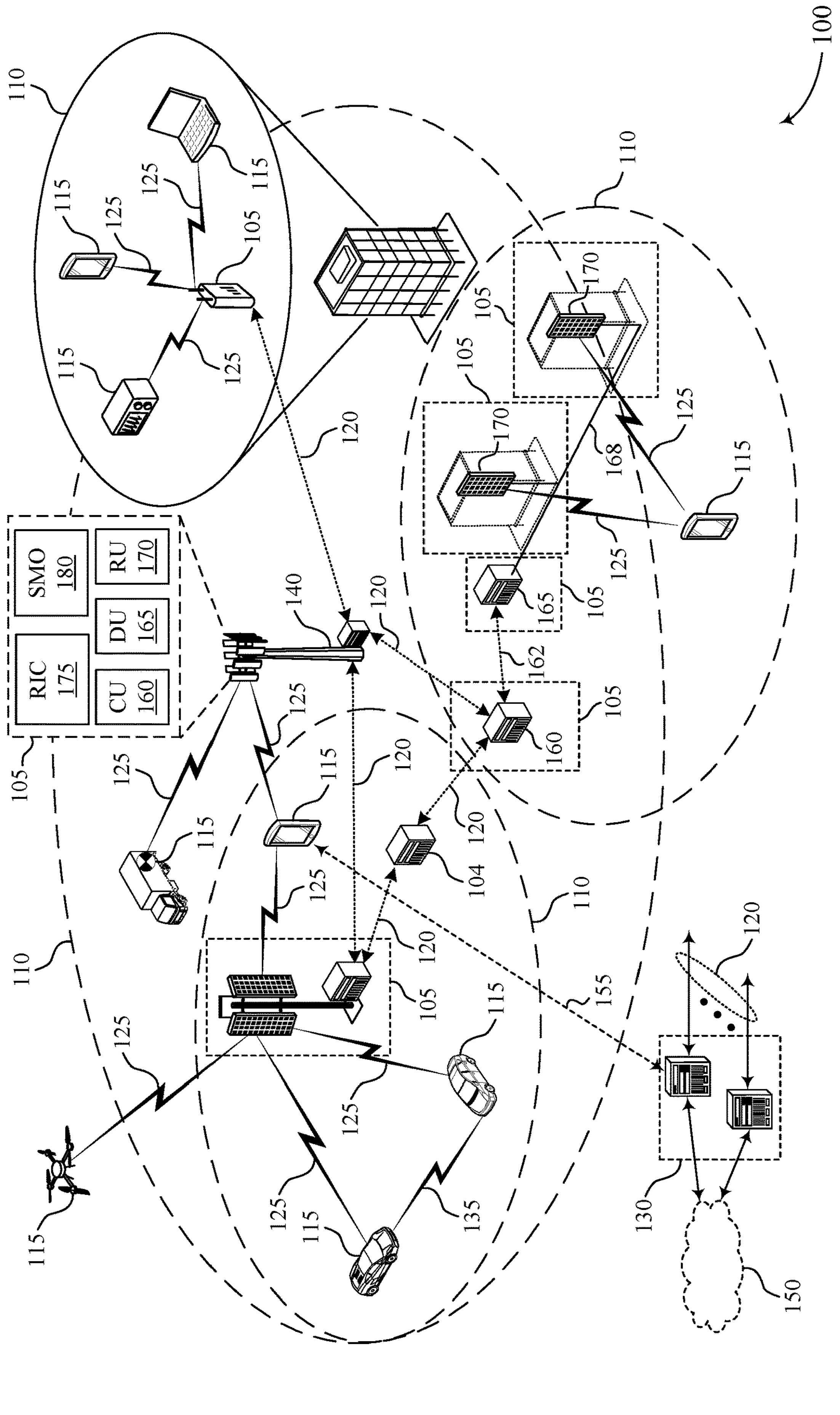
FIG. 1 illustrates an example of a wireless communications system that supports multi-antenna reader channel state information (CSI) acquisition in accordance with one or more aspects of the present disclosure.

Some low-cost and low-complexity devices implement radio frequency identification (RFID) techniques for communications, for example, instead of or in addition to communications via a Uu, Wi-Fi, or PC5 interface. RFID techniques are very low power communications, commonly relying on backscatter modulation. In systems that use backscatter modulation, an interrogation signal from an interrogating device (e.g., a network node/RFID reader) is reflected back to the interrogating device by the interrogated device (e.g., the RFID tag or energy harvesting (EH)-capable device) with information modulated on the reflected signal. Accordingly, an EH-capable device may consume relatively little power, as most (or all) of the energy used to backscatter communications is provided by the interrogating device. Backscatter modulation supports a short range (e.g., less than 10 meters), as the power of the downlink signal (the interrogating signal) must be sufficiently high to support energy-harvesting at the EH-capable device (e.g., more than −13 dBm). Additionally, multi-path reflections can cause fading and further decrease the range. To increase the received power of the interrogating signal at the EH-capable device, the reader may perform channel selection and/or spatial beamforming for the interrogating signal based on channel state information (CSI). Acquiring CSI at the interrogating device, however, may involve feedback from the EH-capable device based on CSI reference signals (CSI-RSs) or transmissions of sounding reference signals (SRSs), both of which are energy intensive at the EH-capable device.

Aspects of the disclosure relate to determination of CSI at the interrogating device based on measurements of backscattered signals reflected from the EH-capable device. A network node (e.g., the interrogating device) with multiple antennas may indicate, to the EH-capable device, a frequency shift to be applied by the EH-capable device to backscattering. The network node may transmit reference signals from each antenna of the network node. The EH-capable device may backscatter the received reference signals in accordance with the indicated frequency shift, and the network node may measure the frequency-shifted backscattered responses to the reference signals to determine CSI between the different antennas and the EH-capable device.

Based on the identified CSI, the network node may perform channel selection and/or spatial beamforming to increase the received power at the EH-capable device for downlink transmissions to the EH-capable device. The frequency shift may enable the network node to identify the EH-capable device. For example, the network node may indicate for a first EH-capable device to use a first frequency shift and for a second EH-capable device to use a second frequency shift. The network node may identify which EH-capable device given backscatter responses are received from based on the frequency shifts of the backscatter responses with respect to the transmitted reference signals. The network node may transmit the reference signals using time division multiplexing (TDM), frequency division multiplexing (FDM), and/or code division multiplexing (CDM) techniques.

Aspects of the disclosure are initially described in the context of wireless communications systems. Aspects of the disclosure are further illustrated by and described with reference to apparatus diagrams, system diagrams, process flows, and flowcharts that relate to multi-antenna reader CSI acquisition.

FIG. 1 illustrates an example of a wireless communications system 100 that supports multi-antenna reader CSI acquisition in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information: and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multi-antenna reader CSI acquisition as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IOT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other aspects, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of TDM techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a carrier may support multiple cells, and different cells may be configured according to different protocol types (e.g., MTC, narrow band IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

Some low-cost and low-complexity devices are being proposed that implement RFID techniques for communications, for example, instead of or in addition to communications via a Uu, Wi-Fi, or PC5 interface. RFID techniques are low power communications, commonly relying on backscatter modulation. RFID techniques may be used in applications such as inventory/asset management, IoT, sustainable sensor networks in factories and/or agriculture, and smart home devices. In systems that use backscatter modulation, an interrogation signal from an interrogating device (e.g., a network node/RFID reader) is reflected back to the interrogating device by the interrogated device (e.g., the RFID tag or EH-capable device) with information modulated on the reflected signal. In some aspects, an interrogating device may be a network entity 105 or a UE 115 as described herein. In some aspects, an EH-capable device may be a UE 115 as described herein. An EH-capable device may consume relatively little power, as most (or all) of the energy used to backscatter communications is provided by the interrogating device. RFID devices may accordingly have low operating expenses, low maintenance demands, and long-life.

In some aspects, a network entity 105 may read and/or write information stored on a passive IoT device (e.g., an RFID tag or EH-capable device). The network entity 105 may provide energy to a passive or semi-passive IoT device, and an information bearing signal may be reflected to the network entity 105 via backscattering modulation. The network entity 105 may read the reflected signal (e.g., the backscatter response) from the IoT device and decode the information transmitted by the IoT devices.

Backscatter modulation supports a short range (e.g., less than 10 meters), as the power of the downlink signal (the interrogating signal) must be sufficiently high to support energy-harvesting at the EH-capable device (e.g., more than −13 dBm). Additionally, multi-path reflections can cause fading and further decrease the range. To increase the received power of the interrogating signal at the EH-capable device, the reader may perform channel selection and/or spatial beamforming for the interrogating signal based on CSI. Acquiring CSI at the interrogating device, however, may involve feedback from the EH-capable device based on CSI-RSs or transmissions of SRSs, both of which are energy intensive at the EH-capable device.

In some aspects, the interrogating device may determine the CSI based on measurements of backscattered signals reflected from the EH-capable device. A network node (e.g., the interrogating device) with multiple antennas may indicate, to the EH-capable device, a frequency shift to be applied by the EH-capable device to backscattering. The network node may transmit reference signals from each antenna of the network node. The EH-capable device may backscatter the received reference signals in accordance with the indicated frequency shift, and the network node may measure the frequency-shifted backscattered responses to the reference signals to determine CSI between the different antennas and the EH-capable device.

Based on the identified CSI, the network node may perform channel selection and/or spatial beamforming to increase the received power at the EH-capable device for downlink transmissions to the EH-capable device. The frequency shift may enable the network node to identify the EH-capable device. For example, the network node may indicate for a first EH-capable device to use a first frequency shift and for a second EH-capable device to use a second frequency shift. The network node may identify which EH-capable device given backscatter responses are received from based on the frequency shifts of the backscatter responses with respect to the transmitted reference signals. The network node may transmit the reference signals using TDM, FDM, and/or CDM techniques.

Figure 2:
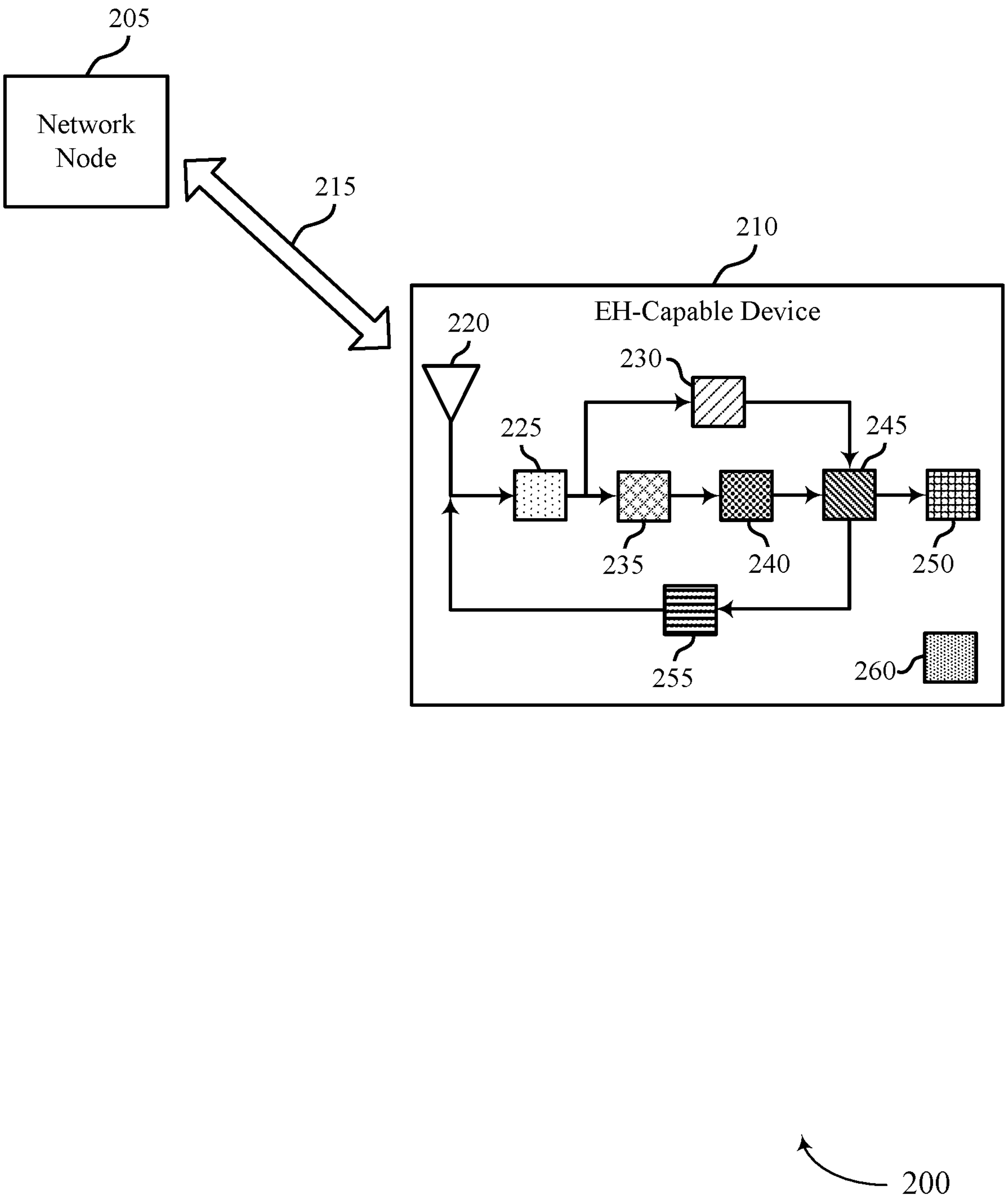
FIG. 2 illustrates an example of a wireless communications system that supports multi-antenna reader CSI acquisition in accordance with one or more aspects of the present disclosure.

FIG. 2 illustrates an example of a wireless communications system 200 that supports multi-antenna reader CSI acquisition in accordance with one or more aspects of the present disclosure. The wireless communications system 200 may implement or be implemented by aspects of the wireless communications system 100 described with reference to FIG. 1.

The wireless communications system 200 may include a network node 205 (e.g., a network entity 105 or a UE 115 as described with reference to FIG. 1) and an EH-capable device 210 (e.g., a UE 115 as described with reference to FIG. 1). The wireless communications system 200 may support communications between the network node 205 and the EH-capable device 210. For example, the network node 205 may communicate signals with the EH-capable device 210 over a communication link 215, which may be an example of a communication link 125 described with reference to FIG. 1.

The EH-capable device 210 may include various components to support the communication of signaling with the network node 205. For example, the EH-capable device 210 may include an antenna 220 that supports the reception of signals transmitted by the network node 205 and the transmission of signals to the network node 205. The EH-capable device 210 may also include an impedance matcher 225 (e.g., coupled with the antenna 220). The impedance matcher 225 may be a fixed or adjustable component that may set an impedance of a line from the antenna 220. Absorption or reflection of signals received at the antenna 220 may be based on an impedance of the impedance matcher.

The EH-capable device 210 may include a power harvester 235 that is operable to harvest energy from energy signals received from the network node 205. For example, energy signals received from the network node 205 may be routed to the power harvester 235, which may harvest energy from the energy signals to power one or more components of the EH-capable device 210. In some aspects, the EH-capable device 210 may include a regulator 240 that is operable to regulate the energy harvested by the power harvester 235. For example, the regulator 240 may regulate the energy to a voltage or a current that is compatible with the one or more components powered by the energy.

The EH-capable device 210 may include a demodulator 230 that is operable to demodulate signals received from the network node 205 and send the demodulated signals to a controller 245 included in the EH-capable device 210. In some aspects, the controller 245 may be an example of a microcontroller. The controller 245 may process the demodulated signals and perform one or more operations based on the information included in the demodulated signals. For example, the controller 245 may operate a sensor 250 or an actuator 250 included in (e.g., or coupled with, connected to) the EH-capable device 210 in accordance with the information. For instance, the controller 245 may activate the sensor 250, deactivate the sensor 250, read a measurement taken by the sensor 250, activate the actuator 250, deactivate the actuator 250, or a combination thereof, among other operations that the controller 245 may perform.

In some aspects, the controller 245 may send signaling to a modulator 255 that is to be transmitted to the network node 205. The modulator 255 may modulate the signaling in accordance with an MCS and send the modulated signaling to the antenna 220 for transmission. For example, the modulator 255 may modulate an energy signal based on determined CSI and send the modulate energy signal to the antenna 220 for transmission to the network node 205. Additionally, the modulator 255 may modulate identification information associated with the EH-capable device 210, data, information associated with operation of the EH-capable device 210, or information associated with the sensor 250 or the actuator 250, among other types of signaling that may be modulated by the modulator 255 and transmitted to the network node 205.

The wireless communications system 200 may support various types of EH-capable devices 210. For example, a first type of EH-capable device 210 may correspond to an EH-capable device 210 that excludes or is unconnected from a power source, such as a battery 260 (although other types of power sources are possible). Here, the components of the EH-capable device 210 may be powered by the energy harvested from energy signals received at the EH-capable device 210. A second type of EH-capable device 210 may correspond to an EH-capable device 210 that includes or is connected to a power source, such as the battery 260. Here, the components of the EH-capable device 210 may be powered by the energy harvested from energy signals, the battery 260, or a combination thereof. In some aspects, the power harvested from the energy signals may be used to charge the battery 260, which may increase a battery life of the battery 260 and reduce a frequency at which the battery 260 is replaced, among other benefits.

Figure 3:
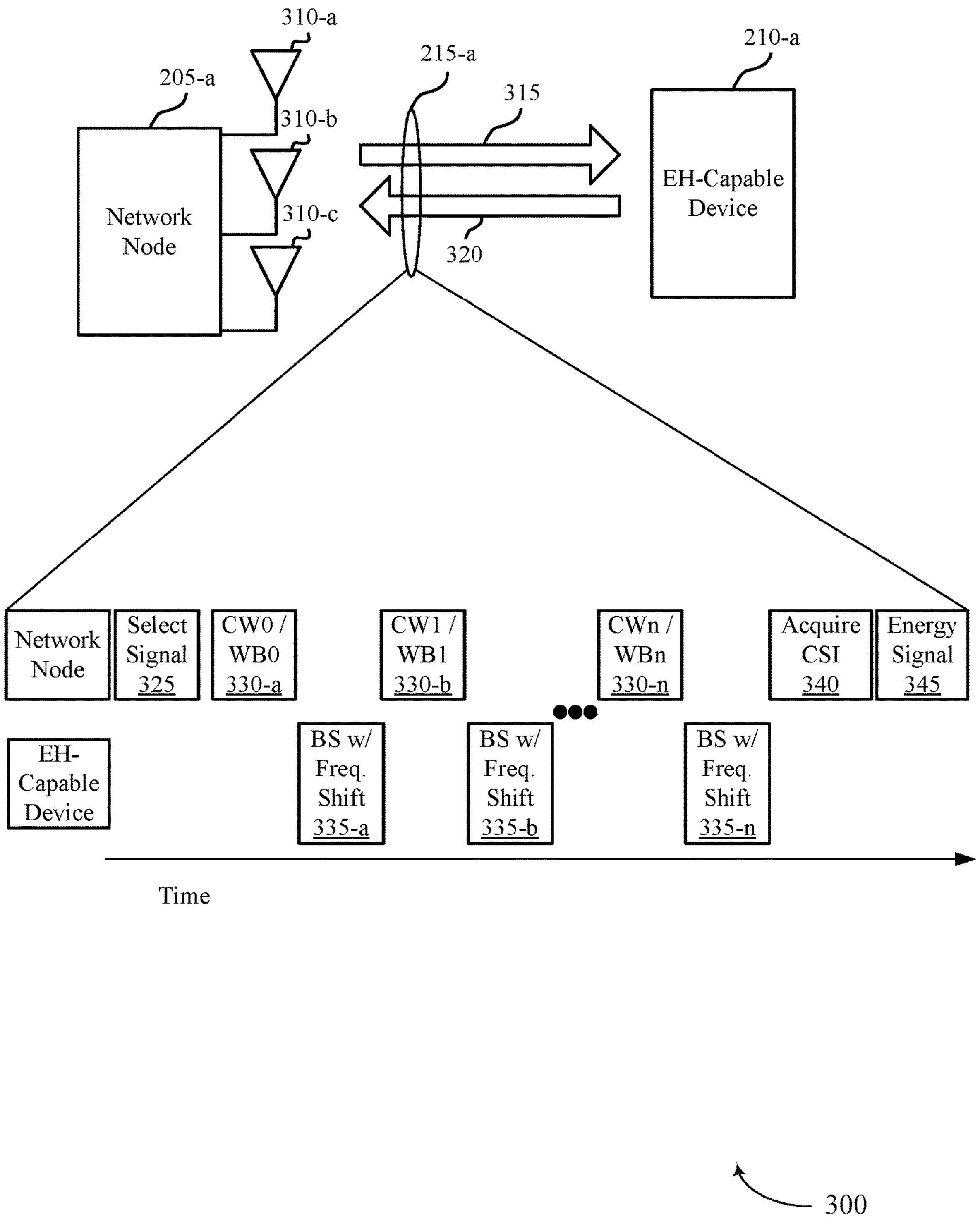
FIG. 3 illustrates an example of a wireless communications system that supports multi-antenna reader CSI acquisition in accordance with one or more aspects of the present disclosure.

FIG. 3 illustrates an example of a wireless communications system 300 that supports multi-antenna reader CSI acquisition in accordance with one or more aspects of the present disclosure. The wireless communications system 300 may implement or be implemented by aspects of the wireless communications system 100 described with reference to FIG. 1 or the wireless communications system 200 as described with reference to FIG. 2. For example, the wireless communications system 300 includes a network node 205-*a* and an EH-capable device 210-*a*, which may be examples of a network node 205 and an EH-capable device 210 as described herein.

The wireless communications system 300 may support communications between the network node 205-*a* and the EH-capable device 210-*a*. For example, the network node 205-*a* may communicate signals with the EH-capable device 210-*a* over a communication link 215-*a*, which may be an example of a communication link 215 described with reference to FIG. 2. For example, the network node 205-*a* may transmit signals 315 to the EH-capable device 210-*a*, and the EH-capable device 210-*a* may reflect backscattered responses 320 to the signals 315 using backscatter modulation.

The network node 205-*a* may include multiple antennas (e.g., an antenna 310-*a*, an antenna 310-*b*, and an antenna 310-*c*). To increase the received power of the interrogating signals transmitted by the network node 205-*a* (e.g., the signals 315) at the EH-capable device 210-*a*, the network node 205-*a* may perform channel selection and/or spatial beamforming for the interrogating signal based on CSI between the antennas 310 of the network node 205-*a* and the EH-capable device 210-*a*. The network node 205-*a* may determine the CSI based on measurements of backscattered responses reflected from the EH-capable device 210-*a*.

The network node 205-*a* may transmit control information (e.g., a select signal 325) indicating a frequency shift for the EH-capable device 210-*a* to apply to backscattering. The network node 205-*a* may transmit a set of reference signals 330 from the multiple antennas 310, and may receive the frequency-shifted backscatter responses 335 from the EH-capable device 210-*a*. For example, the network node 205-*a* may transmit a first reference signal 330-*a* (e.g., a first codeword or wideband signal) and may receive a corresponding first frequency-shifted backscatter response 335-*a*. The network node 205-*a* may transmit a second reference signal 330-*b* (e.g., a second codeword or wideband signal)

and receive a corresponding second frequency-shifted backscatter response 335-*b*. The network node 205-*a* may continue to transmit reference signals and receive corresponding backscatter responses until transmitting a last reference signal 330-*n* and receiving a last corresponding frequency-shifted backscatter response 335-*n*. At 340, after reception of the frequency-shifted backscatter responses 335, the network node 205-*a* may estimate the CSI between the antennas 310 of the network node 205-*a* and the EH-capable device 210-*a* based on the transmitted reference signals 330 and the frequency-shifted backscatter responses 335. The network node 205-*a* may subsequently transmit a signal 345 to the EH-capable device 210-*a* using channel selection and/or spatial beamforming based on the determined CSI.

The frequency shift may enable the network node 205-*a* to identify the EH-capable device 210-*a*. For example, the network node 205-*a* may indicate for a first EH-capable device (e.g., the EH-capable device 210-*a*) to use a first frequency shift and for a second EH-capable device 210 to use a second frequency shift. The network node may identify which EH-capable device given frequency-shifted backscatter responses are received from based on the frequency shifts of the backscatter responses with respect to the transmitted reference signals. Accordingly, the select signal 325 may include an indication of the frequency shift to apply and an identifier for the EH-capable device 210-*a*.

In some aspects, the network node 205-*a* may transmit the reference signals 330 using FDM techniques, and the EH-capable device 210-*a* may backscatter the reference signals 330 using the respective indicated frequency shifts. In an FDM method, the different antennas 310 at the network node 205-*b* may transmit reference signals 330 within one channel. In some aspects, in an FDM method, the different antennas 310 at the network node 205-*a* may transmit reference signals 330 in a same time resource (e.g., symbol period). The EH-capable device 210-*a* may backscatter the reference signals with the indicated frequency shift within the same ambient IoT channel (e.g., assuming channel reciprocity and the that the channel remains constant within an ambient IoT channel). The network node 205-*a* may estimate the channel (e.g., may estimate the CSI) between the network node 205-*a* and the EH-capable device 210-*a* based on the frequency-shifted backscatter responses 335 to the FDMed reference signals 330. Based on the frequency of the received frequency-shifted backscatter responses 335, the network node 205-*a* may estimate the channel (e.g., may estimate the CSI) for each respective channel between each antenna 310 and the EH-capable device 210-*a*. An FDM method may use a time period of T, where Tis a symbol period used to transmit a reference signal 330. An FDM method may support up to M antennas for one EH-capable device 210. If N<M, where N is the quantity of EH-capable devices 210, then the EH-capable devices 210 may be multiplexed via having each of the N EH-capable devices 210 apply a different frequency shift. A maximum number of EH-capable devices 210 that may be supported may be given by $$\left\lfloor \frac{N}{M} \right\rfloor.$$

In some aspects, the network node 205-*a* may transmit the reference signals 330 using CDM techniques, and the EH-capable device 210-*a* may backscatter the reference signals 330 using the respective indicated frequency shift. For example, the network node 205-*a* may transmit the reference signals 330 via applying different precoding vectors (e.g., using existing codebooks) across the antennas 310 in TDM/FDM. The EH-capable device 210-*a* may backscatter the reference signals 330 with the indicated frequency shift within the same ambient IoT channel (e.g., assuming channel reciprocity and the that the channel remains constant within an ambient IoT channel). The network node 205-*a* may compare the signal strength of the frequency-shifted backscatter responses 335 from the different precoding vectors and select the best precoding vector (e.g., based on the signal strengths). For example, the received signal for a precoder vector, $p=[p_1, p_2, \ldots, p_M] \in C^{Mx1}$, may be written as: $y=h(p^T h)$, where $y=[y_1, y_2, \ldots, y_M]$ and the channel, $h=[h_1, h_2, \ldots, h_M]$. One metric that may be used for the comparison between the different precoding vectors may be: |γ|^2, as h is the same for all the precoding vectors and p^T h may be the CSI metric which the network node 205-*a* is comparing. As with FDM methods, the quantity (N) of EH-capable devices 210 that may be multiplexed using a CDM method depends on the quantity of distinct frequency shifts (L). In some aspects, the network node 205-*a* may transmit control information to the EH-capable device 210-*a* indicating for the EH-capable device 210-*a* to keep the reflection coefficient of the EH-capable device 210-*a* fixed during TDMing of different antennas and/or precoding vectors.

Depending on the acquired CSI at 340, the network node 205-*a* may apply the matched filter precoding used TDM or FDM methods, or mode select the best precoding vector in a CDM method. In the case of multiple EH-capable devices 210, the network node 205-*a* may select the channel that may either optimize the average energy signal efficiency over all of the EH-capable devices 210, or may select a channel that may optimize the EH-capable devices 210 with lower channel gains.

Figure 4:
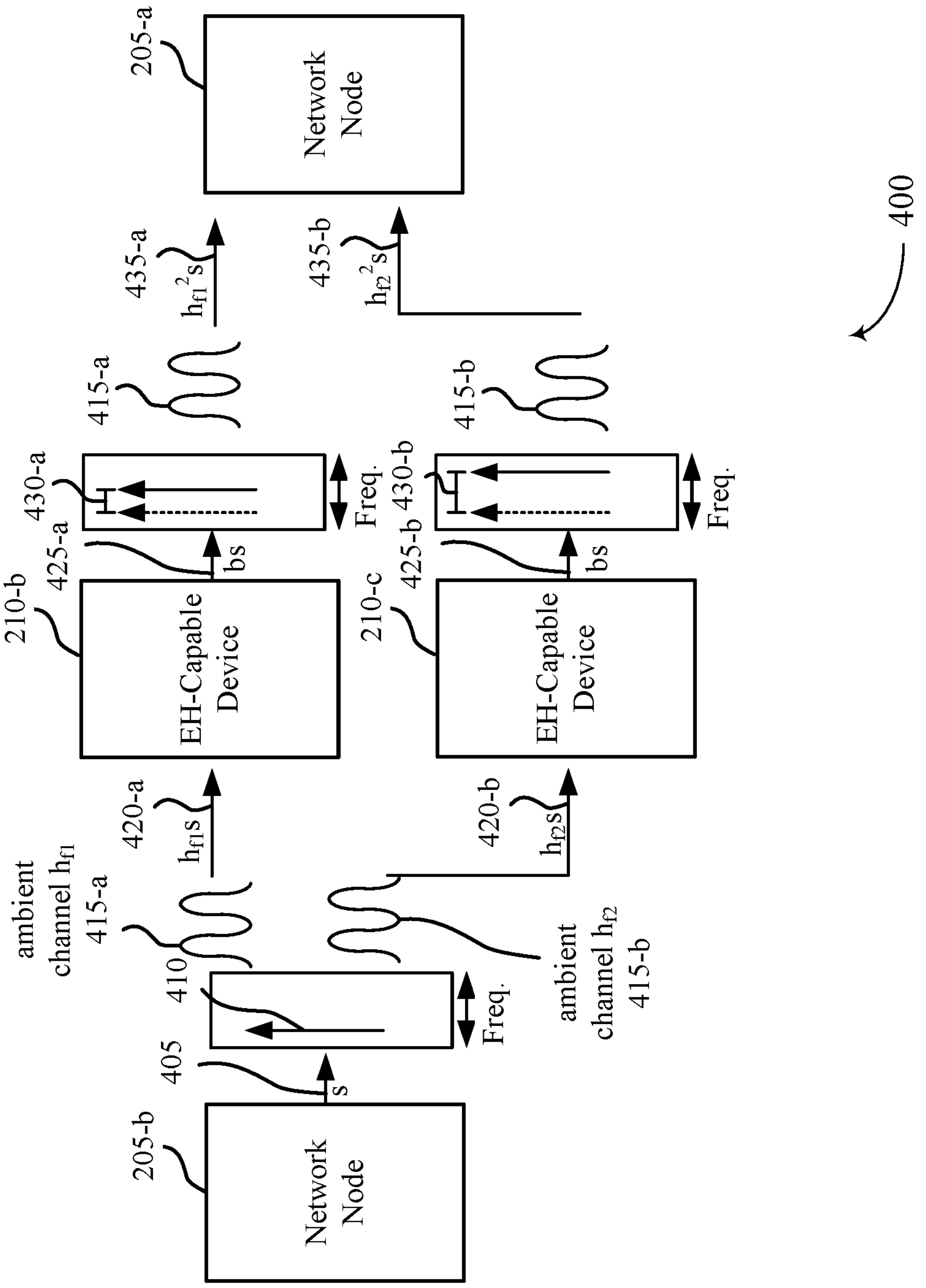
FIG. 4 illustrates an example of a wireless communications system that supports multi-antenna reader CSI acquisition in accordance with one or more aspects of the present disclosure.

FIG. 4 illustrates an example of a wireless communications system 400 that supports multi-antenna reader CSI acquisition in accordance with one or more aspects of the present disclosure. The wireless communications system 400 may implement or be implemented by aspects of the wireless communications system 100 described with reference to FIG. 1, the wireless communications system 200 as described with reference to FIG. 2, or the wireless communications system 300 as described with reference to FIG. 3. For example, the wireless communications system 400 includes a network node 205-*b*, an EH-capable device 210-*b*, and an EH-capable device 210-*c*, which may be examples of a network node 205 and EH-capable devices 210 as described herein.

As described herein, the network node 205-*b* may include multiple antennas and may determine the CSI between the multiple antennas and the EH-capable device(s) 210 based on transmitting reference signals 330 and receiving corresponding frequency-shifted backscatter responses 335.

In some aspects, the network node 205-*b* may transmit the reference signals using TDM techniques, and the EH-capable devices 210 may backscatter the reference signals using the respective indicated frequency shifts. The respective backscatter responses may be received by the network node 205-*b* in the same ambient IoT channel 415 as the respective reference signals (e.g., assuming channel reciprocity and that the respective IoT channels 415 remain constant).

For example, the network node 205-*b* may transmit a first reference signal s 405 with a first frequency 410 via a first antenna of the network node 205-*b*. The ambient IoT channel 415-*a* between the first antenna of the network node 205-*b* and the EH-capable device 210-*b* may be given by $hf_1$, and accordingly, the signal 420-*a* received by the EH-capable device 210-*b* may be given by $hf_1s$. Similarly, the ambient IoT channel 415-*b* between the first antenna of the network node 205-*a* and the EH-capable device 210-*c* may be given by $hf_2$, and accordingly, the signal 420-*b* received by the EH-capable device 210-*c* may be given by $hf_2s$. The EH-capable device 210-*b* may apply an indicated frequency shift 430-*a* to the received signal 420-*a*, and accordingly, may reflect a frequency-shifted backscatter signal 425-*a*. Assuming channel reciprocity, the frequency-shifted backscatter signal 435-*a* received by the network node 205-*b* from the EH-capable device 210-*b* may be given by $hf_1^2s$, where the frequency of the frequency-shifted backscatter signal 435-*a* is shifted by the indicated frequency shift 430-*a* as compared to the reference signal 405. The EH-capable device 210-*c* may similarly apply an indicated frequency shift 430-*b* to the received signal 420-*b*, and accordingly, may reflect a frequency-shifted backscatter signal 425-*b*. Assuming channel reciprocity, the frequency-shifted backscatter signal 435-*b* received by the network node 205-*b* from the EH-capable device 210-*c* may be given by $hf_2^2s$, where the frequency of the frequency-shifted backscatter signal 435-*b* is shifted by the indicated frequency shift 430-*b* as compared to the reference signal 405. The network node 205-*b* may estimate the channels (e.g., $hf_1$ and $hf_2$) between the first antenna and the EH-capable devices 210 based on the received frequency-shifted backscatter signals 435.

The network node 205-*b* may repeat this process for each M antenna of the network node 205-*b* to determine the channels between the M antennas and the EH-capable devices 210. Accordingly, for M antennas, a time period MT may be used to determine the channels between the M antennas and the EH-capable devices 210, where Tis the time required for transmission of one symbol (e.g., one reference signal 405). Such a process may be used for up to N EH-capable devices 210, where N is the quantity of different frequency shifts supported within one ambient channel while satisfying power demands at the EH-capable devices 210. The network node 205-*b* may also be aware of the reflection coefficients for the EH-capable devices 210 (e.g., based on prior measurements or reporting).

In some aspects, to reduce the time duration for CSI acquisition, the network node 205-*b* may multiplex reference signal transmissions using both TDM and FDM techniques, depending on the quantity of antennas at the reader (M), the quantity of EH-capable devices (N), and the quantity of distinct frequency shifts (L).

Figure 5:
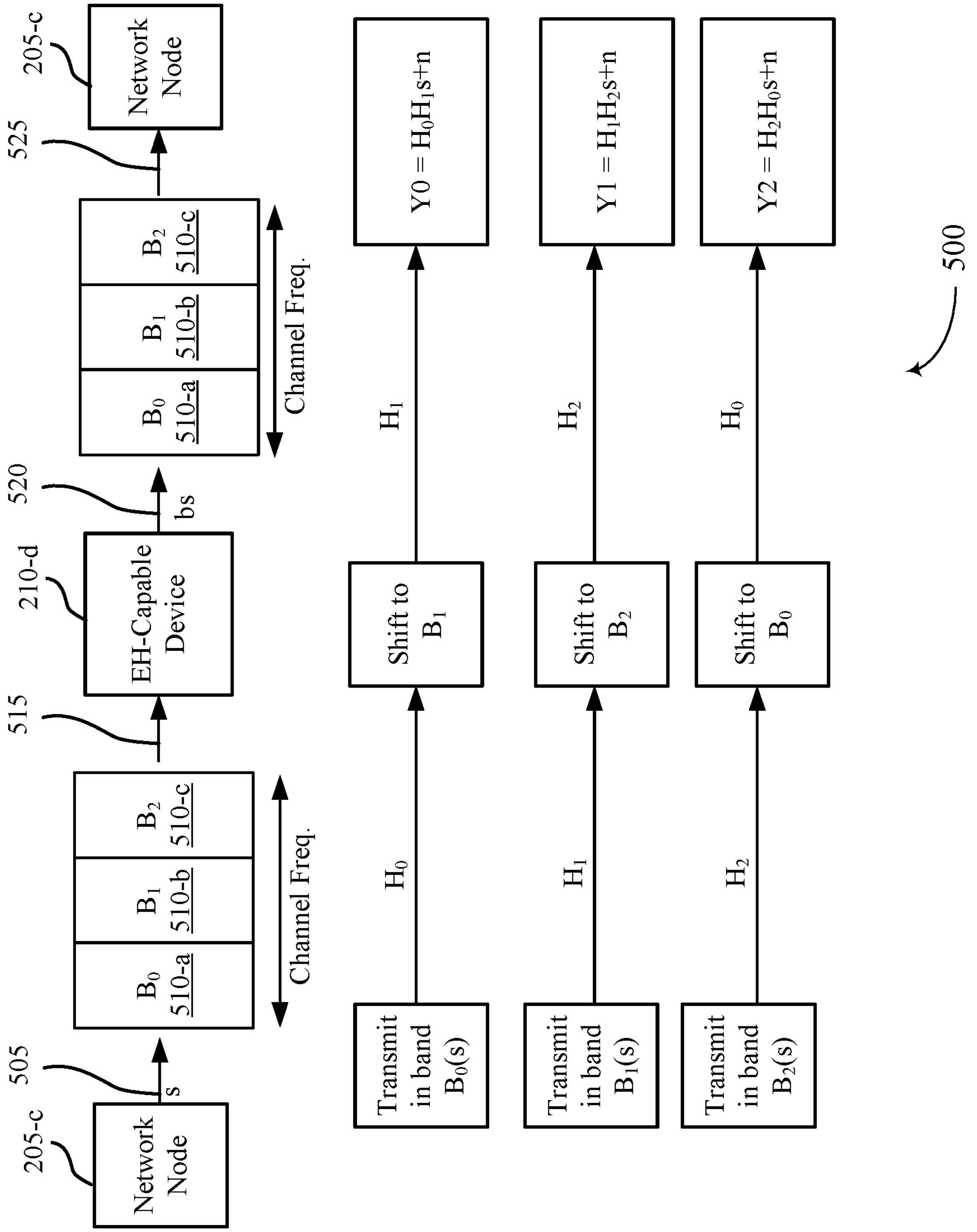
FIG. 5 illustrates an example of a wireless communications system that supports multi-antenna reader CSI acquisition in accordance with one or more aspects of the present disclosure.

FIG. 5 illustrates an example of a wireless communication system 500 that supports multi-antenna reader CSI acquisition in accordance with one or more aspects of the present disclosure. The wireless communications system 500 may implement or be implemented by aspects of the wireless communications system 100 described with reference to FIG. 1, the wireless communications system 500 as described with reference to FIG. 2, the wireless communications system 300 as described with reference to FIG. 3, or the wireless communications system 400 as described with reference to FIG. 4. For example, the wireless communications system 500 includes a network node 205-*c* and an EH-capable device 210-*d*, which may be examples of a network node 205 and EH-capable devices 210 as described herein.

As described herein, the network node 205-*c* may include multiple antennas and may determine the CSI between the multiple antennas and the EH-capable device 210-*d* based on transmitting reference signals 330 and receiving corresponding frequency-shifted backscatter responses 335. In some aspects, the network node 205-*c* may divide a wideband channel into multiple sub-bands 510 (e.g., a first sub-band, a second sub-band, and a third sub-band). Each sub-band may include several ambient IoT channels.

The network node 205-*c* may transmit reference signals 505 using TDM/FDM/CDM as described herein. TDM/FDM/CDM may be applied for the antennas in the ambient channels of all of the sub-bands, and the sub-bands may be transmitted in a TDM manner. The EH-capable device 210-*d* may backscatter the received reference signals 515 using a frequency shift that shifts the received reference signals 515 to a different sub-band. For example, a reference signal 515 received by the EH-capable device 210-*d* in the sub-band 510-*a* may shifted to the sub-band 510-*b*, a reference signal 515 received by the EH-capable device 210-*d* in the sub-band 510-*b* may shifted to the sub-band 510-*c*, and a reference signal 515 received by the EH-capable device 210-*d* in the sub-band 510-*c* may shifted to the sub-band 510-*a*. The frequency-shifted backscatter responses 520 reflected by the EH-capable device 210-*d* may be received at the network node 205-*c* as frequency-shifted backscatter responses 525. The EH-capable device 210-*d* may apply a same frequency shift during any symbol period (e.g., may apply a first frequency shift during a first symbol period (e.g., shifting from sub-band 510-*a* to sub-band 510-*b* and from sub-band 510-*b* to sub-band 510-*c*) and may apply a second frequency shift during a second symbol period (e.g., shifting from sub-band 510-*c* to sub-band 510-*a*)).

The network node 205-*c* may estimate the channel between the network node 205-*c* and the EH-capable device 210-*d* based on the frequency-shifted backscatter responses 525 for each antenna of the EH-capable device 210-*d*, using $$H_0^2 = y_0 y_2 \left( \frac{y_1^*}{y_1^2 + \sigma^2} \right)$$

in the transmission of three sub-bands. For example, for a signal s transmitted by the network node 205-*c* in the sub-band 510-*a*, the received frequency-shifted backscatter response 525 is given by $y_0=H_0H_1s+n$, where the EH-capable device 210-*d* shifts the frequency of the signal from the sub-band 510-*a* to the sub-band 510-*b*. For a signal s transmitted by the network node 205-*c* in the sub-band 510-*b*, the received frequency-shifted backscatter response 525 is given by $y_1=H_1H_2s+n$, where the EH-capable device 210-*d* shifts the frequency of the signal from the sub-band 510-*b* to the sub-band 510-*c*. For a signal s transmitted by the network node 205-*c* in the sub-band 510-*c*, the received frequency-shifted backscatter response 525 is given by $y_2=H_0H_1s+n$, where the EH-capable device 210-*d* shifts the frequency of the signal from the sub-band 510-*c* to the sub-band 510-*a*.

Figure 6:
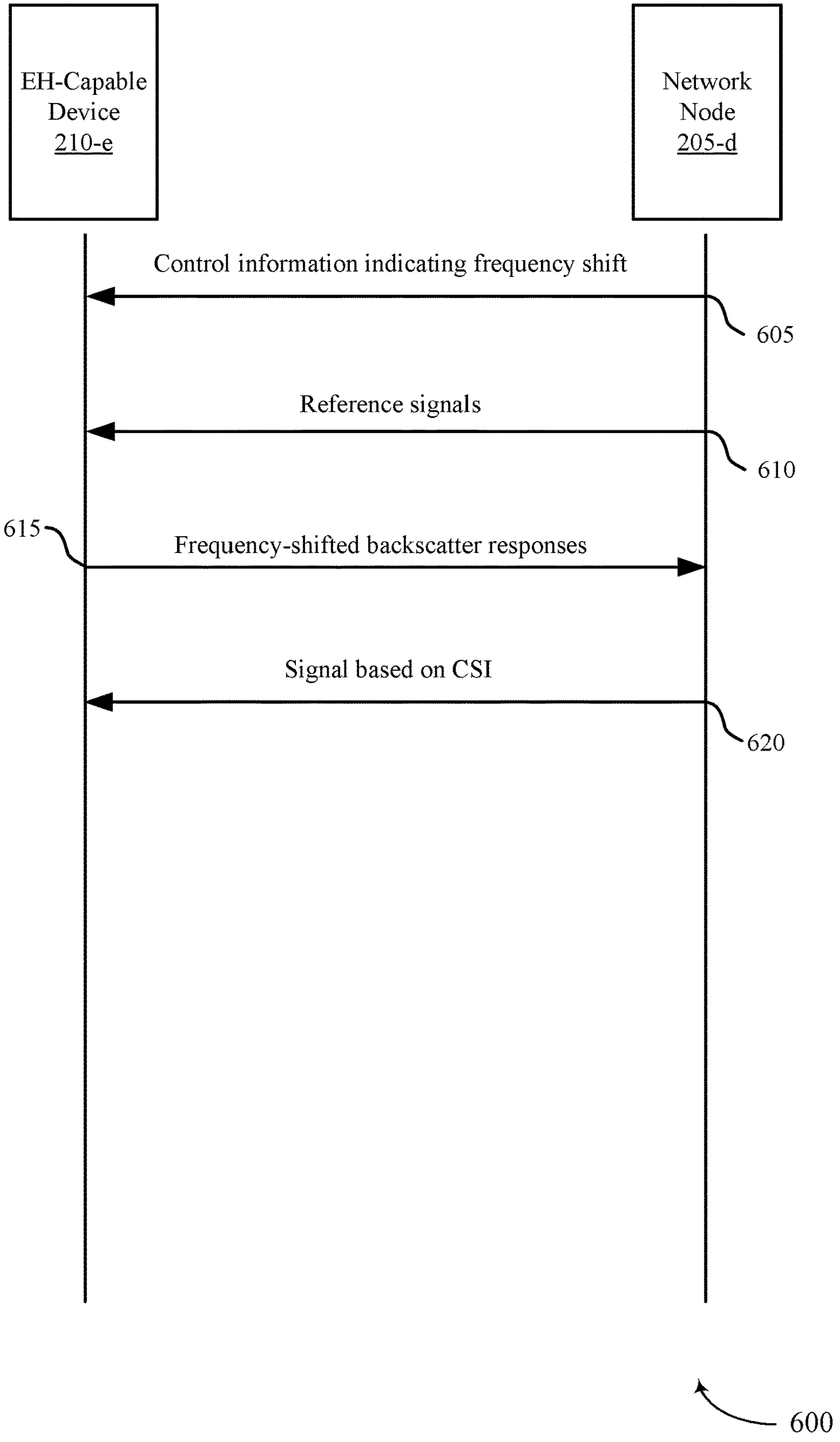
FIG. 6 illustrates an example of a process flow that supports multi-antenna reader CSI acquisition in accordance with one or more aspects of the present disclosure.

FIG. 6 illustrates an example of a process flow 600 that supports multi-antenna reader CSI acquisition in accordance with one or more aspects of the present disclosure. The process flow 600 may include a network node 205-*d* and an EH-capable device 210-*e*, which may be examples of a network node 205 and an EH-capable device 210 as described herein. In the following description of the process flow 600, the operations between the network node 205-*d* and EH-capable device 210-*e* may be transmitted in a different order than the example order shown, or the operations performed by the network node 205-*d* and EH-capable device 210-*e* may be performed in different orders or at different times. Some operations may also be omitted from the process flow 600, and other operations may be added to the process flow 600.

At 605, the EH-capable device 210-*e* may receive, from the network node 205-*d*, control information including an indication of a frequency shift to apply to backscatter-modulation. In some aspects, the control information may be indicative of an identifier for the EH-capable device 210-*e*.

At 610, the network node 205-*d* may transmit a first reference signal via a first antenna and a second reference signal via a second antenna.

At 615, the network node 205-*d* may receive, from the EH-capable device 210-*e*, a first frequency-shifted backscatter response corresponding to the first reference signal and a second frequency-shifted backscatter response corresponding to the second reference signal. The EH-capable device 210-*e* may backscatter the first reference signal and the second reference signal in accordance with the frequency shift indicated at 605.

At 620, the network node 205-*d* may transmit, to the EH-capable device 210-*e*, a signal based on CSI, where the CSI is based on the first frequency-shifted backscatter response and the second frequency-shifted backscatter response.

In some aspects, the network node 205-*d* may TDM the first reference signal and the second reference signal. In some aspects, the network node 205-*d* may FDM the first reference signal and the second reference signal.

In some aspects, the network node 205-*d* may CDM the first reference signal and the second reference signal. In some aspects, the first reference signal may be associated with a first precoding vector and the second reference signal may be also associated with the first precoding vector. In some aspects, the network node 205-*d* may transmit a third reference signal via the first antenna and a fourth reference signal via the second antenna, and the third and fourth reference signals may be associated with a second precoding vector. The network node 205-*d* may receive, from the EH-capable device 210-*e*, a third frequency-shifted backscatter response corresponding to the third reference signal and a fourth frequency-shifted backscatter response corresponding to the fourth reference signal, and the CSI may further be based on the third frequency-shifted backscatter response and the fourth frequency-shifted backscatter response. In some aspects, the network node 205-*d* may transmit the signal at 630 using one of the first precoding vector or the second precoding vector. In some aspects, the network node 205-*d* may determine, based on the CSI, a particular precoding vector to use to transmit the signal where the particular precoding vector is either the first precoding vector or the second precoding vector. In some aspects, the network node 205-*d* may determine the CSI based on a respective strength for each of the first frequency-shifted backscatter response, the second frequency-shifted backscatter response, the third frequency-shifted backscatter response, and the fourth frequency-shifted backscatter response, where determining the particular precoding vector involves determining the particular precoding vector based on the respective strength for each of the first frequency-shifted backscatter response, the second frequency-shifted backscatter response, the third frequency-shifted backscatter response, and the fourth frequency-shifted backscatter response.

In some aspects, the CSI includes first CSI based on the first frequency-shifted backscatter response and second CSI based on the second frequency-shifted backscatter response.

In some aspects, the network node 205-*d* may transmit the first reference signal via a first sub-band and a first time resource and the second reference signal via a second sub-band and the first time resource. At 610, the network node 205-*d* may further transmit a third reference signal via the first antenna via the second sub-band and a second time resource and a fourth reference signal via the second antenna via the first sub-band and the second time resource. The network node 205-*d* may receive, from the EH-capable device 210-*e* at 615, a third frequency-shifted backscatter response corresponding to the third reference signal and a fourth frequency-shifted backscatter response corresponding to the fourth reference signal, and the CSI is further based on the third frequency-shifted backscatter response and the fourth frequency-shifted backscatter response. In some aspects, at 605, the network node 205-*d* may transmit, to the EH-capable device 210-*e*, control information that is indicative of a first frequency shift to apply to the first sub-band and to the second sub-band during the first time resource and a second frequency shift to apply to the first sub-band and to the second sub-band during the second time resource, the first frequency-shifted backscatter response and the second frequency-shifted backscatter response are received at 615 in accordance with the first frequency shift, and the third frequency-shifted backscatter response and the fourth frequency-shifted backscatter response are received at 615 in accordance with the second frequency shift.

In some aspects, the network node 205-*d* may further transmit, to a second EH-capable device, second control information that is indicative of a second frequency shift to be applied to the first reference signal and the second reference signal. At 615, the network node 205-*d* may receive, from the second EH-capable device, a third frequency-shifted backscatter response corresponding to the first reference signal and a fourth frequency-shifted backscatter response corresponding to the second reference signal, where receipt of the third frequency-shifted backscatter response and the fourth frequency-shifted backscatter response is in accordance with the second frequency shift. The network node 205-*d* may subsequently transmit, to the second EH-capable device, a signal based on second CSI, where the second CSI is based on the third frequency-shifted backscatter response and the fourth frequency-shifted backscatter response.

In some aspects, the network node 205-*d* may select a first beam associated with the first reference signal based on the CSI, the second reference signal is associated with a second beam, and transmission of the signal at 620 is via the first beam.

In some aspects, at 605, the network node 205-*d* may transmit, to the EH-capable device 210-*e*, an indication with the control information for the EH-capable device to apply a same reflection coefficient to the first reference signal and the second reference signal, and the CSI is based on the same reflection coefficient.

Figure 7:
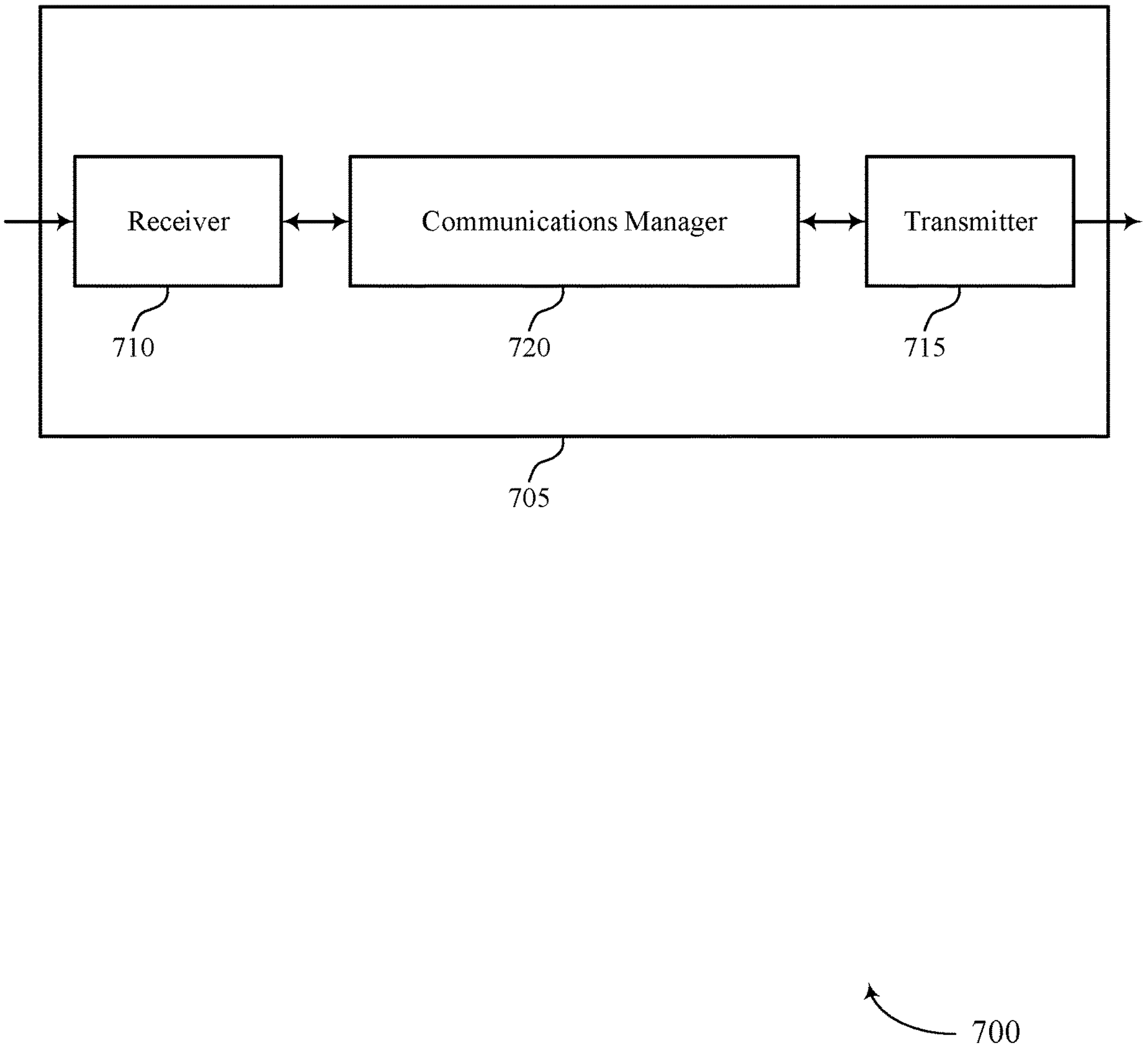
FIGS. 7 and 8 illustrate block diagrams of devices that support multi-antenna reader CSI acquisition in accordance with one or more aspects of the present disclosure.

FIG. 7 illustrates a block diagram 700 of a device 705 that supports multi-antenna reader CSI acquisition in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some aspects, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some aspects, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of multi-antenna reader CSI acquisition as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a network node in accordance with examples as disclosed herein. For example, the communications manager 720 may be configured as or otherwise support a means for transmitting a first reference signal via a first antenna and a second reference signal via a second antenna. The communications manager 720 may be configured as or otherwise support a means for receiving, from an EH-capable device, a first frequency-shifted backscatter response corresponding to the first reference signal and a second frequency-shifted backscatter response corresponding to the second reference signal. The communications manager 720 may be configured as or otherwise support a means for transmitting, to the EH-capable device, a signal based on CSI, where the CSI is based on the first frequency-shifted backscatter response and the second frequency-shifted backscatter response.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
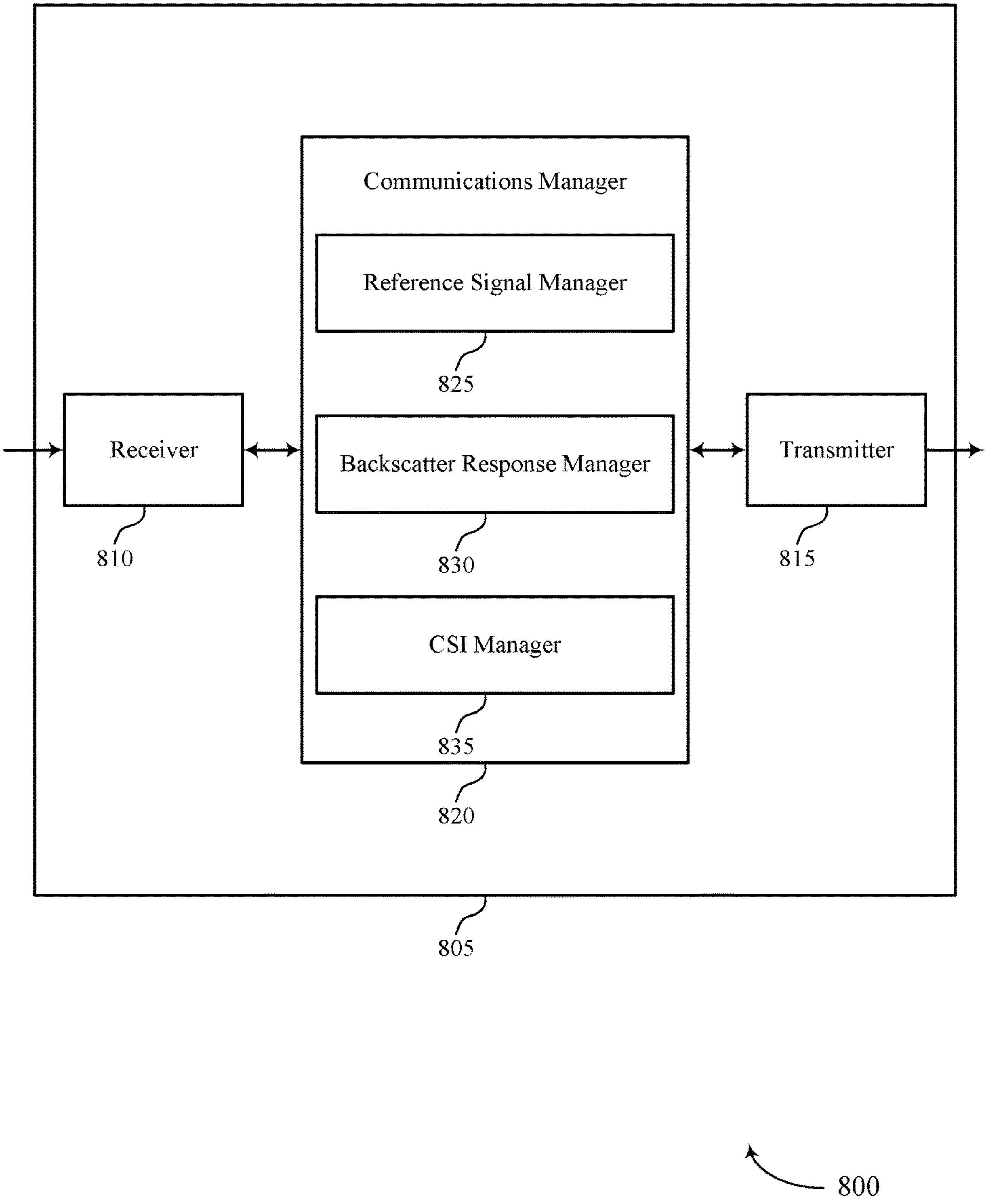

FIG. 8 illustrates a block diagram 800 of a device 805 that supports multi-antenna reader CSI acquisition in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some aspects, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some aspects, the transmitter 815 and the receiver 810 may be co-located in a transceiver, which may include or be coupled with a modem.

The device 805, or various components thereof, may be an example of means for performing various aspects of multi-antenna reader CSI acquisition as described herein. For example, the communications manager 820 may include a reference signal manager 825, a backscatter response manager 830, a CSI manager 835, or any combination thereof. The communications manager 820 may be an example of aspects of a communications manager 720 as described herein. In some aspects, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network node in accordance with examples as disclosed herein. The reference signal manager 825 may be configured as or otherwise support a means for transmitting a first reference signal via a first antenna and a second reference signal via a second antenna. The backscatter response manager 830 may be configured as or otherwise support a means for receiving, from an EH-capable device, a first frequency-shifted backscatter response corresponding to the first reference signal and a second frequency-shifted backscatter response corresponding to the second reference signal. The CSI manager 835 may be configured as or otherwise support a means for transmitting, to the EH-capable device, a signal based on CSI, where the CSI is based on the first frequency-shifted backscatter response and the second frequency-shifted backscatter response.

Figure 9:
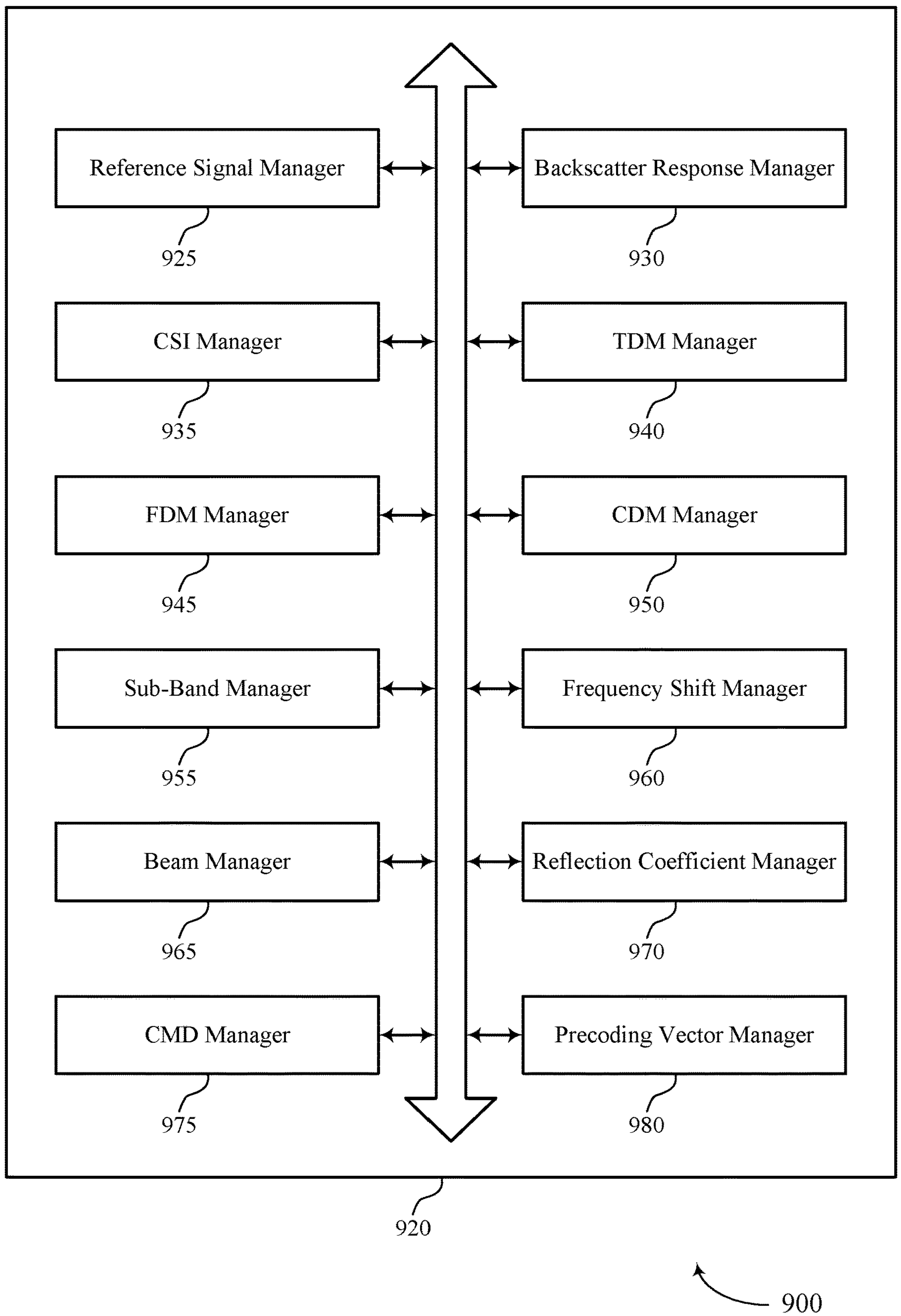
FIG. 9 illustrates a block diagram of a communications manager that supports multi-antenna reader CSI acquisition in accordance with one or more aspects of the present disclosure.

FIG. 9 illustrates a block diagram 900 of a communications manager 920 that supports multi-antenna reader CSI acquisition in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multi-antenna reader CSI acquisition as described herein. For example, the communications manager 920 may include a reference signal manager 925, a backscatter response manager 930, a CSI manager 935, a TDM manager 940, an FDM manager 945, a CDM manager 950, a sub-band manager 955, a frequency shift manager 960, a beam manager 965, a reflection coefficient manager 970, an CMD manager 975, a precoding vector manager 980, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a network node in accordance with examples as disclosed herein. The reference signal manager 925 may be configured as or otherwise support a means for transmitting a first reference signal via a first antenna and a second reference signal via a second antenna. The backscatter response manager 930 may be configured as or otherwise support a means for receiving, from an EH-capable device, a first frequency-shifted backscatter response corresponding to the first reference signal and a second frequency-shifted backscatter response corresponding to the second reference signal. The CSI manager 935 may be configured as or otherwise support a means for transmitting, to the EH-capable device, a signal based on CSI, where the CSI is based on the first frequency-shifted backscatter response and the second frequency-shifted backscatter response.

In some aspects, to support transmitting the first reference signal via the first antenna and the second reference signal via the second antenna, the TDM manager 940 may be configured as or otherwise support a means for TDMing the first reference signal and the second reference signal.

In some aspects, to support transmitting the first reference signal via the first antenna and the second reference signal via the second antenna, the FDM manager 945 may be configured as or otherwise support a means for FDMing the first reference signal and the second reference signal.

In some aspects, to support transmitting the first reference signal via the first antenna and the second reference signal via the second antenna, the CDM manager 950 may be configured as or otherwise support a means for CDMing the first reference signal and the second reference signal.

In some aspects, a first precoding vector is associated with the first reference signal and the second reference signal.

In some aspects, the CMD manager 975 may be configured as or otherwise support a means for transmitting a third reference signal via the first antenna and a fourth reference signal via the second antenna, where a second precoding vector is associated with the third reference signal and the fourth reference signal. In some aspects, the backscatter response manager 930 may be configured as or otherwise support a means for receiving, from the EH-capable device, a third frequency-shifted backscatter response corresponding to the third reference signal and a fourth frequency-shifted backscatter response corresponding to the fourth reference signal, where the CSI is based on the third frequency-shifted backscatter response and the fourth frequency-shifted backscatter response.

In some aspects, to support transmitting the signal based on CSI, the precoding vector manager 980 may be configured as or otherwise support a means for transmitting the signal using one of the first precoding vector or the second precoding vector.

In some aspects, to support transmitting the signal based on CSI, the precoding vector manager 980 may be configured as or otherwise support a means for determining, based on the CSI, a particular precoding vector to use to transmit the signal, where the particular precoding vector is one of the first precoding vector or the second precoding vector.

In some aspects, the CSI manager 935 may be configured as or otherwise support a means for determining the CSI based on a respective strength for each of the first frequency-shifted backscatter response, the second frequency-shifted backscatter response, the third frequency-shifted backscatter response, and the fourth frequency-shifted backscatter response, where determining the particular precoding vector includes determining the particular precoding vector based on the respective strength for each of the first frequency-shifted backscatter response, the second frequency-shifted backscatter response, the third frequency-shifted backscatter response, and the fourth frequency-shifted backscatter response.

In some aspects, the CSI includes first CSI based on the first frequency-shifted backscatter response and second CSI based on the second frequency-shifted backscatter response.

In some aspects, the sub-band manager 955 may be configured as or otherwise support a means for transmitting a third reference signal via the first antenna via a second sub-band and a second time resource, where transmitting the first reference signal via the first antenna and the second reference signal via the second antenna includes transmitting the first reference signal via a first sub-band and a first time resource and the second reference signal via the second sub-band and the first time resource. In some aspects, the sub-band manager 955 may be configured as or otherwise support a means for transmitting a fourth reference signal via the second antenna via the first sub-band and the second time resource. In some aspects, the backscatter response manager 930 may be configured as or otherwise support a means for receiving, from the EH-capable device, a third frequency-shifted backscatter response corresponding to the third reference signal and a fourth frequency-shifted backscatter response corresponding to the fourth reference signal, where the CSI is based on the third frequency-shifted backscatter response and the fourth frequency-shifted backscatter response.

In some aspects, the frequency shift manager 960 may be configured as or otherwise support a means for transmitting, to the EH-capable device, control information that is indicative of a first frequency shift to apply to the first sub-band and to the second sub-band during the first time resource and a second frequency shift to apply to the first sub-band and to the second sub-band during the second time resource, where the first frequency-shifted backscatter response and the second frequency-shifted backscatter response are received in accordance with the first frequency shift, and where the third frequency-shifted backscatter response and the fourth frequency-shifted backscatter response are received in accordance with the second frequency shift.

In some aspects, the frequency shift manager 960 may be configured as or otherwise support a means for transmitting, to the EH-capable device, control information that is indicative of a frequency shift to be applied to the first reference signal and the second reference signal, where receipt of the first frequency-shifted backscatter response and the second frequency-shifted backscatter response is in accordance with the frequency shift.

In some aspects, the frequency shift manager 960 may be configured as or otherwise support a means for transmitting, to a second EH-capable device, second control information that is indicative of a second frequency shift to be applied to the first reference signal and the second reference signal. In some aspects, the backscatter response manager 930 may be configured as or otherwise support a means for receiving, from the second EH-capable device, a third frequency-shifted backscatter response corresponding to the first reference signal and a fourth frequency-shifted backscatter response corresponding to the second reference signal, where receipt of the third frequency-shifted backscatter response and the fourth frequency-shifted backscatter response is in accordance with the second frequency shift. In some aspects, the CSI manager 935 may be configured as or otherwise support a means for transmitting, to the second EH-capable device, a second signal based on second CSI, where the second CSI is based on the third frequency-shifted backscatter response and the fourth frequency-shifted backscatter response.

In some aspects, the control information is indicative of an identifier for the EH-capable device.

In some aspects, the beam manager 965 may be configured as or otherwise support a means for selecting a first beam associated with the first reference signal based on the CSI, where the second reference signal is associated with a second beam, and where transmission of the signal is via the first beam.

In some aspects, the reflection coefficient manager 970 may be configured as or otherwise support a means for transmitting, to the EH-capable device, control information indicating for the EH-capable device to apply a same reflection coefficient to the first reference signal and the second reference signal, where the CSI is based on the same reflection coefficient.

Figure 10:
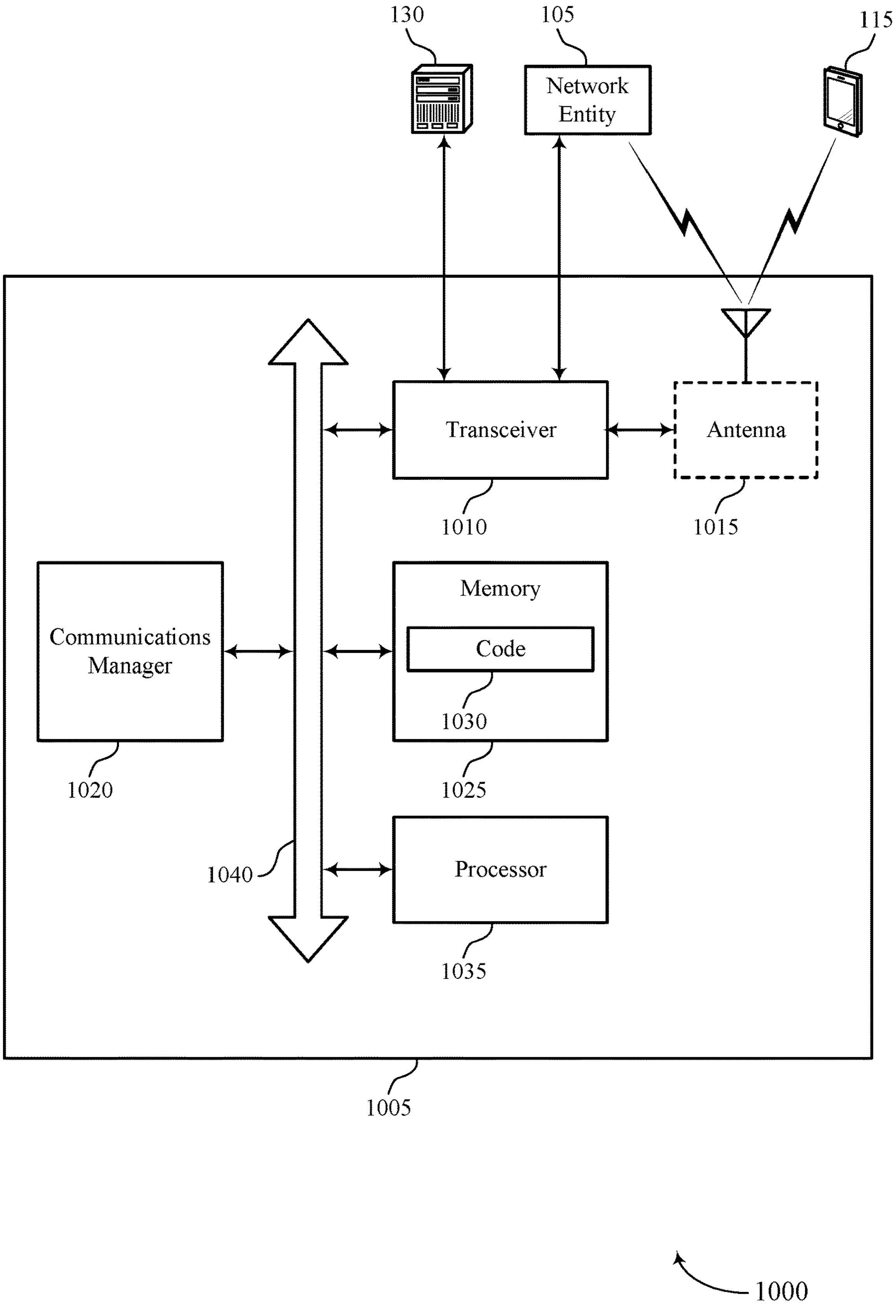
FIG. 10 illustrates a diagram of a system including a device that supports multi-antenna reader CSI acquisition in accordance with one or more aspects of the present disclosure.

FIG. 10 illustrates a diagram of a system 1000 including a device 1005 that supports multi-antenna reader CSI acquisition in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some aspects, the transceiver 1010 may include a wired transceiver and may communicate bi-directionally with another wired transceiver. Additionally, or alternatively, in some aspects, the transceiver 1010 may include a wireless transceiver and may communicate bi-directionally with another wireless transceiver. In some aspects, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some aspects, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting multi-antenna reader CSI acquisition). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1040 may support communications of (e.g., within) a protocol layer of a protocol stack. In some aspects, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some aspects, the communications manager 1020 may manage aspects of communications with a core network 130 (e.g., via one or more wired or wireless backhaul links). For example, the communications manager 1020 may manage the transfer of data communications for client devices, such as one or more UEs 115. In some aspects, the communications manager 1020 may manage communications with other network entities 105, and may include a controller or scheduler for controlling communications with UEs 115 in cooperation with other network entities 105. In some aspects, the communications manager 1020 may support an X2 interface within an LTE/LTE-A wireless communications network technology to provide communication between network entities 105.

The communications manager 1020 may support wireless communications at a network node in accordance with examples as disclosed herein. For example, the communications manager 1020 may be configured as or otherwise support a means for transmitting a first reference signal via a first antenna and a second reference signal via a second antenna. The communications manager 1020 may be configured as or otherwise support a means for receiving, from an EH-capable device, a first frequency-shifted backscatter response corresponding to the first reference signal and a second frequency-shifted backscatter response corresponding to the second reference signal. The communications manager 1020 may be configured as or otherwise support a means for transmitting, to the EH-capable device, a signal based on CSI, where the CSI is based on the first frequency-shifted backscatter response and the second frequency-shifted backscatter response.

By including or configuring the communications manager 1020 in accordance with examples as described herein, the device 1005 may support techniques for improved communication reliability, more efficient utilization of communication resources, and improved coordination between devices.

In some aspects, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some aspects, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of multi-antenna reader CSI acquisition as described herein, or the processor 1035 and the memory 1025 may be otherwise configured to perform or support such operations.

Figure 11:
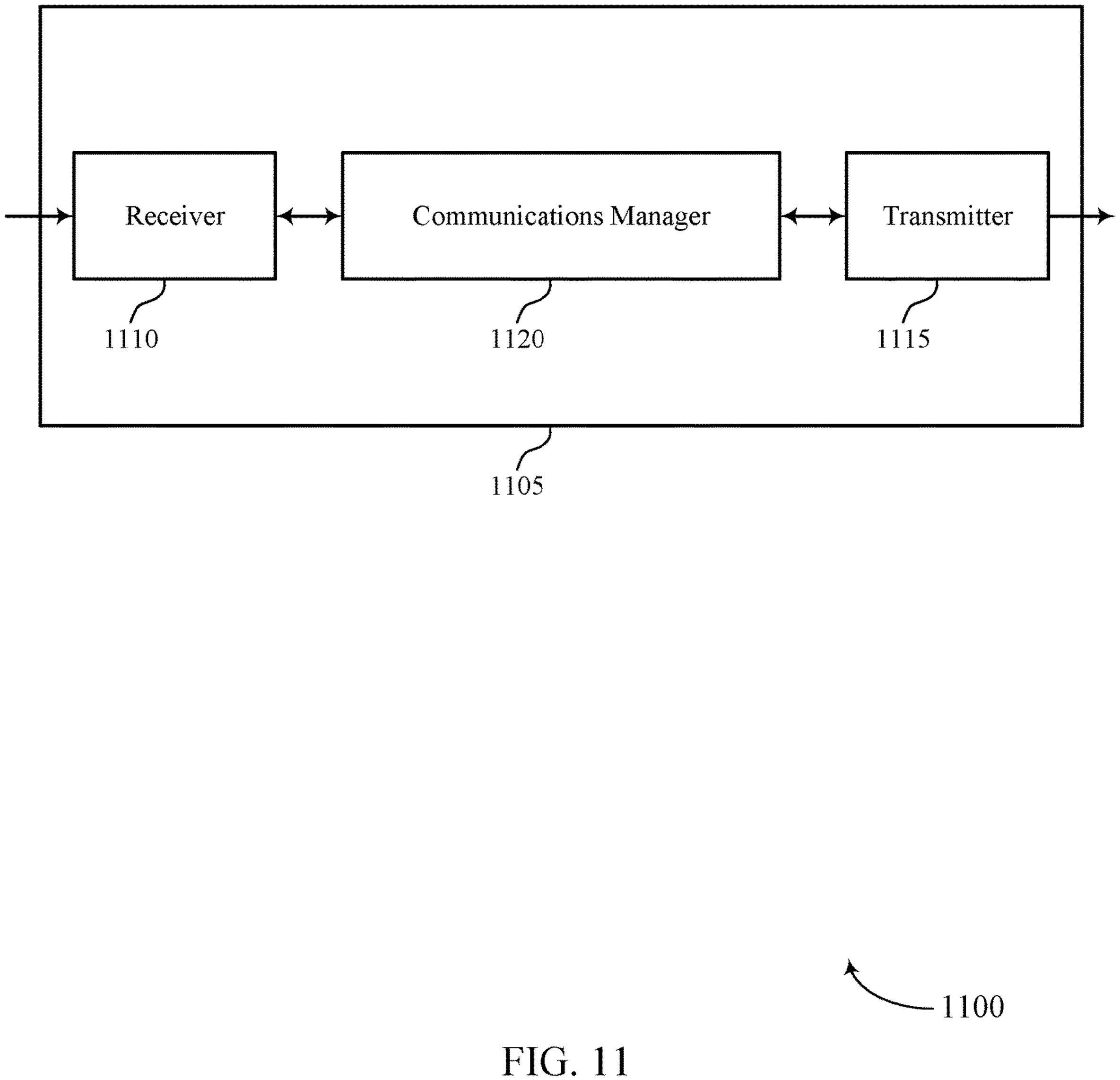
FIGS. 11 and 12 illustrate block diagrams of devices that support multi-antenna reader CSI acquisition in accordance with one or more aspects of the present disclosure.

FIG. 11 illustrates a block diagram 1100 of a device 1105 that supports multi-antenna reader CSI acquisition in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multi-antenna reader CSI acquisition). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multi-antenna reader CSI acquisition). In some aspects, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of multi-antenna reader CSI acquisition as described herein. For example, the communications manager 1120, the receiver 1110, the transmitter 1115, or various combinations or components thereof may support a method for performing one or more of the functions described herein.

In some aspects, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at an EH-capable device in accordance with examples as disclosed herein. For example, the communications manager 1120 may be configured as or otherwise support a means for receiving, from a network node, control information including an indication of a frequency shift to apply to backscatter-modulation. The communications manager 1120 may be configured as or otherwise support a means for receiving, from the network node, a first reference signal and a second reference signal. The communications manager 1120 may be configured as or otherwise support a means for backscatterring the first reference signal and the second reference signal in accordance with the frequency shift.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
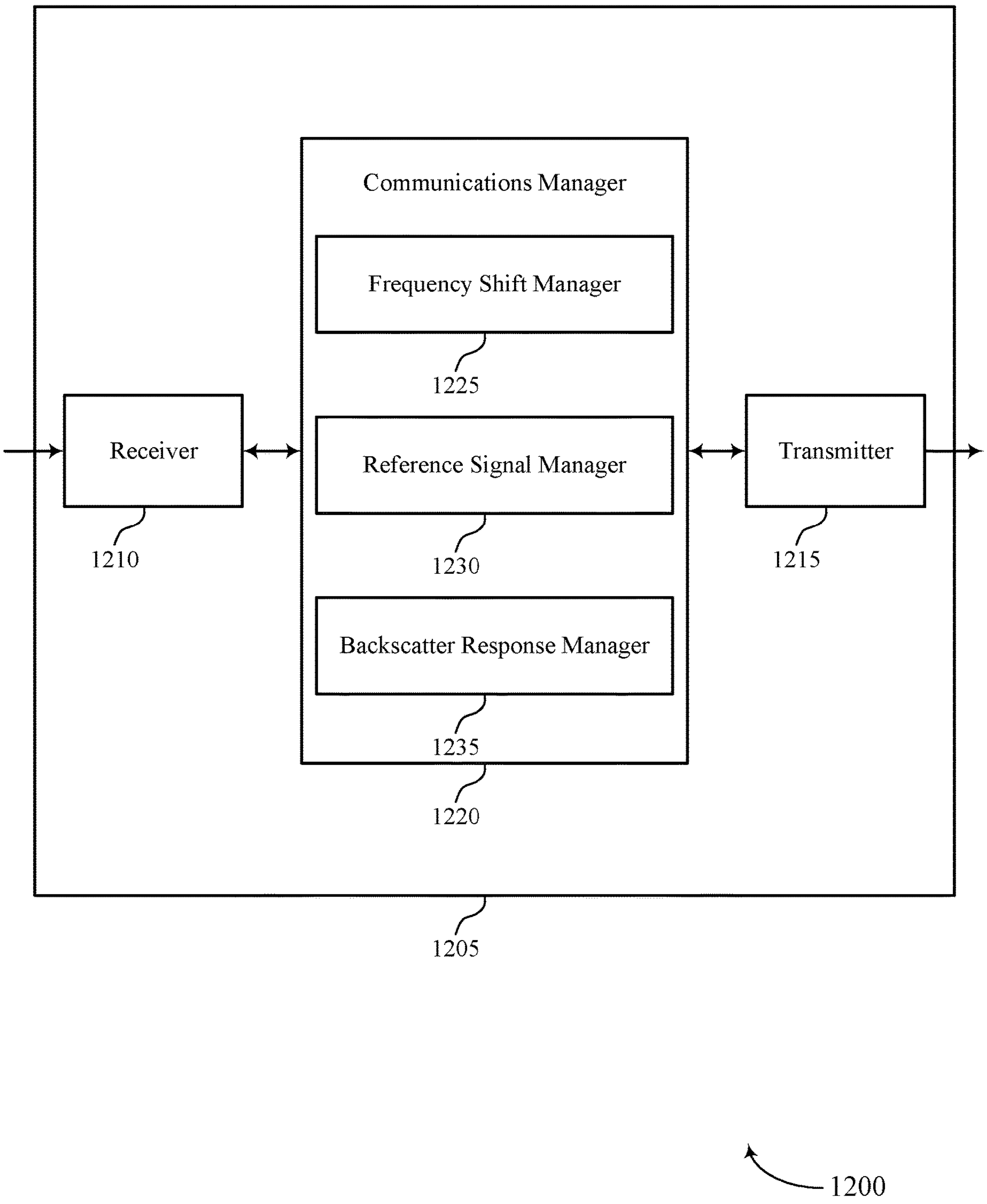

FIG. 12 illustrates a block diagram 1200 of a device 1205 that supports multi-antenna reader CSI acquisition in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multi-antenna reader CSI acquisition). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multi-antenna reader CSI acquisition). In some aspects, the transmitter 1215 may be co-located with a receiver 1210 in a transceiver module. The transmitter 1215 may utilize a single antenna or a set of multiple antennas.

The device 1205, or various components thereof, may be an example of means for performing various aspects of multi-antenna reader CSI acquisition as described herein. For example, the communications manager 1220 may include a frequency shift manager 1225, a reference signal manager 1230, a backscatter response manager 1235, or any combination thereof. The communications manager 1220 may be an example of aspects of a communications manager 1120 as described herein. In some aspects, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at an EH-capable device in accordance with examples as disclosed herein. The frequency shift manager 1225 may be configured as or otherwise support a means for receiving, from a network node, control information including an indication of a frequency shift to apply to backscatter-modulation. The reference signal manager 1230 may be configured as or otherwise support a means for receiving, from the network node, a first reference signal and a second reference signal. The backscatter response manager 1235 may be configured as or otherwise support a means for backscattering the first reference signal and the second reference signal in accordance with the frequency shift.

Figure 13:
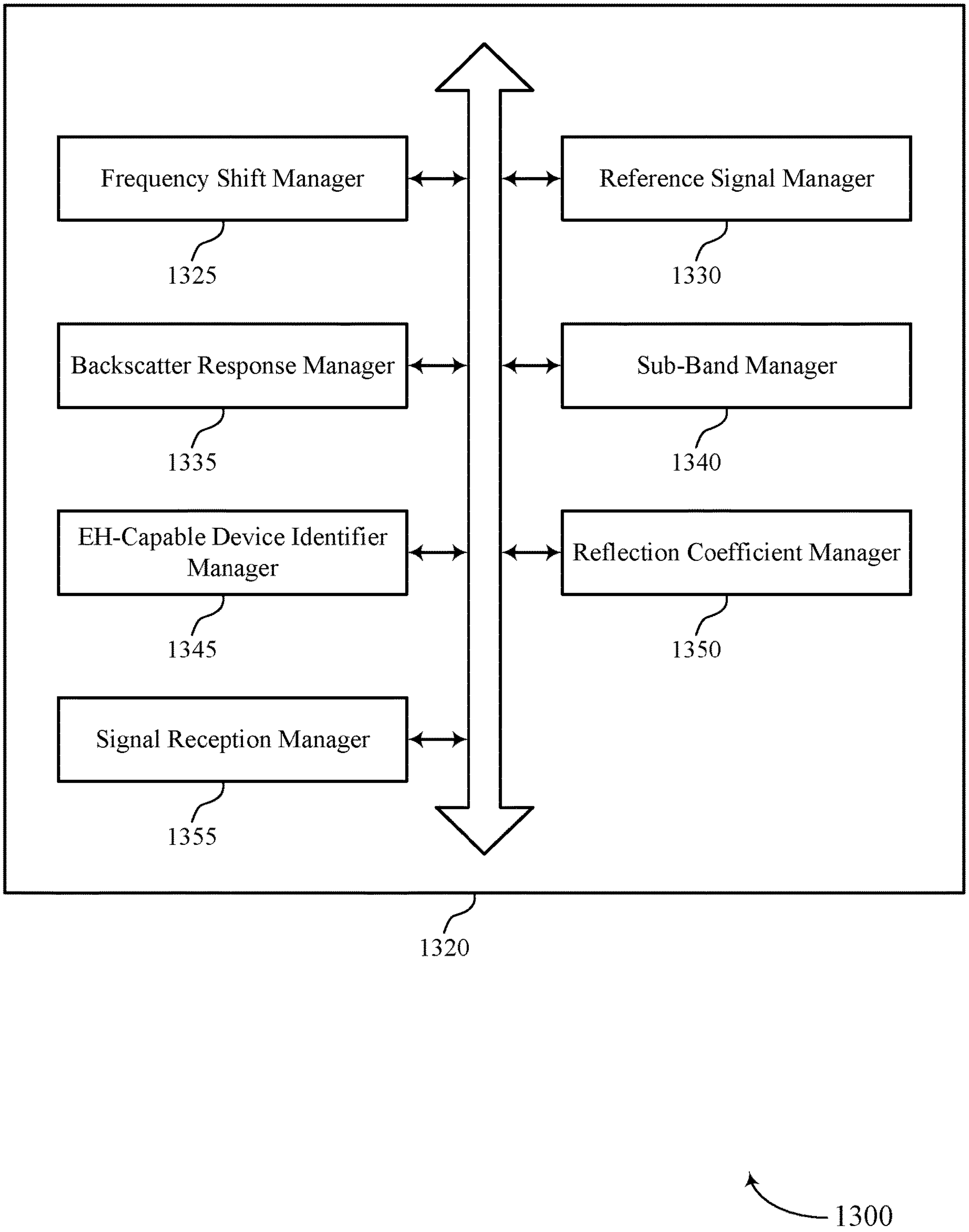
FIG. 13 illustrates a block diagram of a communications manager that supports multi-antenna reader CSI acquisition in accordance with one or more aspects of the present disclosure.

FIG. 13 illustrates a block diagram 1300 of a communications manager 1320 that supports multi-antenna reader CSI acquisition in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of multi-antenna reader CSI acquisition as described herein. For example, the communications manager 1320 may include a frequency shift manager 1325, a reference signal manager 1330, a backscatter response manager 1335, a sub-band manager 1340, a EH-capable device identifier manager 1345, a reflection coefficient manager 1350, a signal reception manager 1355, or any combination thereof. Each of these components may communicate, directly or indirectly, with one another (e.g., via one or more buses).

The communications manager 1320 may support wireless communications at an EH-capable device in accordance with examples as disclosed herein. The frequency shift manager 1325 may be configured as or otherwise support a means for receiving, from a network node, control information including an indication of a frequency shift to apply to backscatter-modulation. The reference signal manager 1330 may be configured as or otherwise support a means for receiving, from the network node, a first reference signal and a second reference signal. The backscatter response manager 1335 may be configured as or otherwise support a means for backscattering the first reference signal and the second reference signal in accordance with the frequency shift.

In some aspects, the indication is indicative of a same frequency shift to apply to the first reference signal and the second reference signal.

In some aspects, the sub-band manager 1340 may be configured as or otherwise support a means for receiving the first reference signal via a first sub-band and the second reference signal via a second sub-band, where the indication is indicative of a first frequency shift to apply to reference signals received via a first sub-band and a second frequency shift to apply to reference signals received via a second sub-band.

In some aspects, to support receiving the control information, the EH-capable device identifier manager 1345 may be configured as or otherwise support a means for receiving an identifier for the EH-capable device.

In some aspects, to support receiving the control information, the reflection coefficient manager 1350 may be configured as or otherwise support a means for receiving an indication to apply a same reflection coefficient to the first reference signal and the second reference signal.

In some aspects, the signal reception manager 1355 may be configured as or otherwise support a means for receiving, from the network node, a signal based on the backscattered first reference signal and the backscattered second reference signal.

Figure 14:
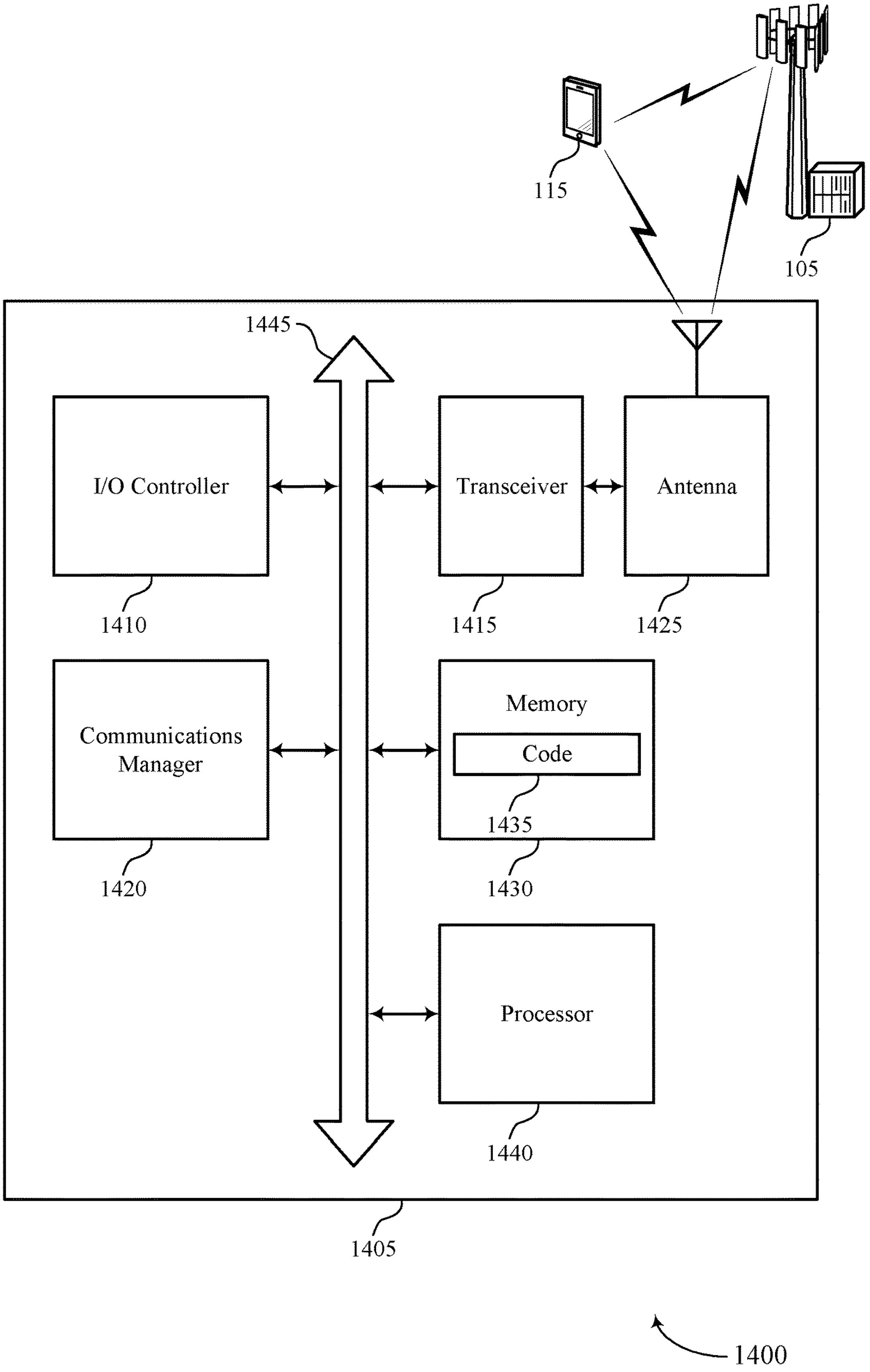
FIG. 14 illustrates a diagram of a system including a device that supports multi-antenna reader CSI acquisition in accordance with one or more aspects of the present disclosure.

FIG. 14 illustrates a diagram of a system 1400 including a device 1405 that supports multi-antenna reader CSI acquisition in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOSR, ANDROIDR, MS-DOS®, MS-WINDOWS®, OS/2R, UNIXR, LINUXR, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting multi-antenna reader CSI acquisition). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at an EH-capable device in accordance with examples as disclosed herein. For example, the communications manager 1420 may be configured as or otherwise support a means for receiving, from a network node, control information including an indication of a frequency shift to apply to backscatter-modulation. The communications manager 1420 may be configured as or otherwise support a means for receiving, from the network node, a first reference signal and a second reference signal. The communications manager 1420 may be configured as or otherwise support a means for backscatterring the first reference signal and the second reference signal in accordance with the frequency shift.

By including or configuring the communications manager 1420 in accordance with examples as described herein, the device 1405 may support techniques for improved communication reliability, more efficient utilization of communication resources, and improved coordination between devices.

In some aspects, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some aspects, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of multi-antenna reader CSI acquisition as described herein, or the processor 1440 and the memory 1430 may be otherwise configured to perform or support such operations.

Figure 15:
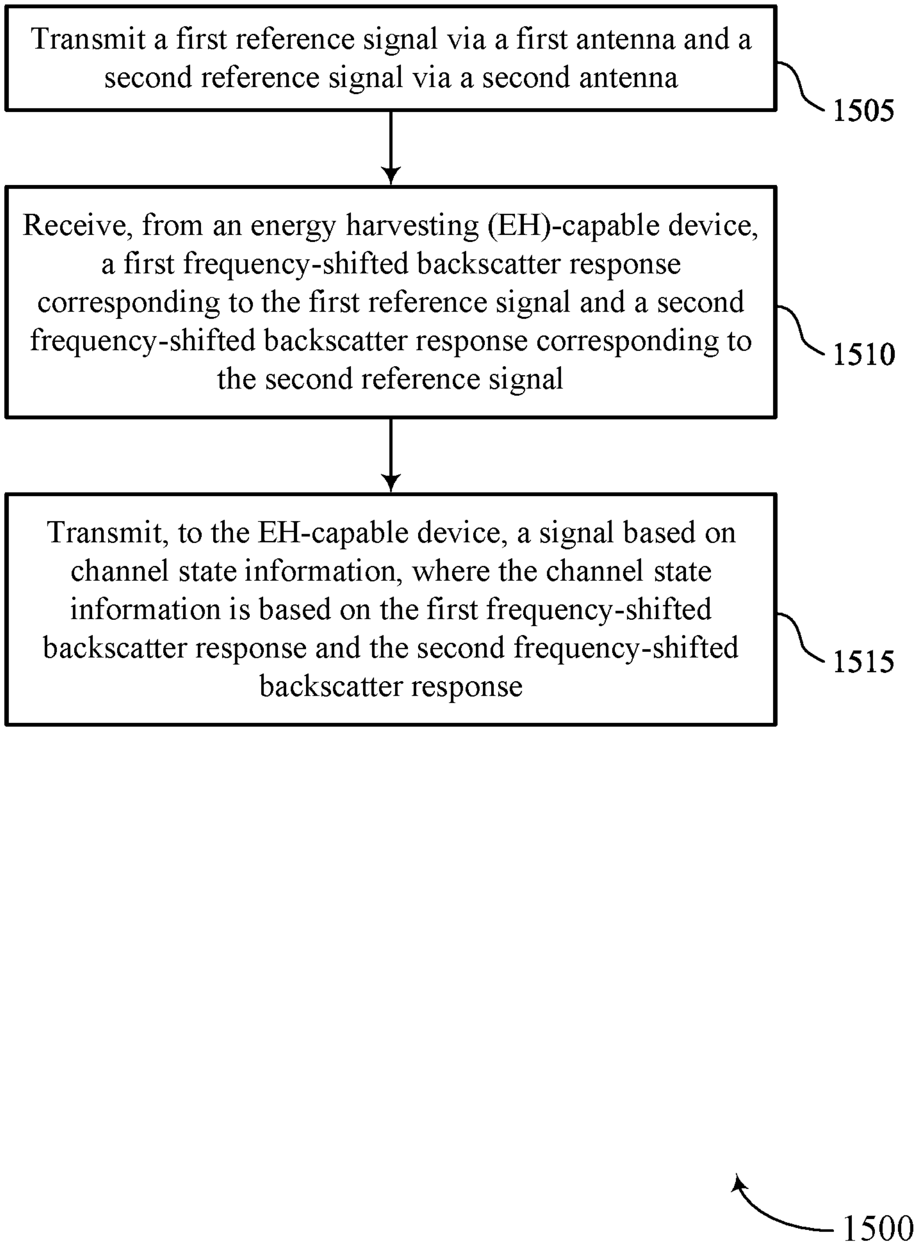
FIGS. 15 through 19 illustrate flowcharts showing methods that support multi-antenna reader CSI acquisition in accordance with one or more aspects of the present disclosure.

FIG. 15 illustrates a flowchart showing a method 1500 that supports multi-antenna reader CSI acquisition in accordance with one or more aspects of the present disclosure. The operations of the method 1500 may be implemented by a network entity or its components as described herein. For example, the operations of the method 1500 may be performed by a network entity as described with reference to FIGS. 1 through 10. In some aspects, a network entity may execute a set of instructions to control the functional elements of the network entity to perform the described functions. Additionally, or alternatively, the network entity may perform aspects of the described functions using special-purpose hardware.

At 1505, the method may include transmitting a first reference signal via a first antenna and a second reference signal via a second antenna. The operations of 1505 may be performed in accordance with examples as disclosed herein. In some aspects, aspects of the operations of 1505 may be performed by a reference signal manager 925 as described with reference to FIG. 9.

At 1510, the method may include receiving, from an EH-capable device, a first frequency-shifted backscatter response corresponding to the first reference signal and a second frequency-shifted backscatter response corresponding to the second reference signal. The operations of 1510 may be performed in accordance with examples as disclosed herein. In some aspects, aspects of the operations of 1510 may be performed by a backscatter response manager 930 as described with reference to FIG. 9.

At 1515, the method may include transmitting, to the EH-capable device, a signal based on CSI, where the CSI is based on the first frequency-shifted backscatter response and the second frequency-shifted backscatter response. The operations of 1515 may be performed in accordance with examples as disclosed herein. In some aspects, aspects of the operations of 1515 may be performed by a CSI manager 935 as described with reference to FIG. 9.

Figure 16:
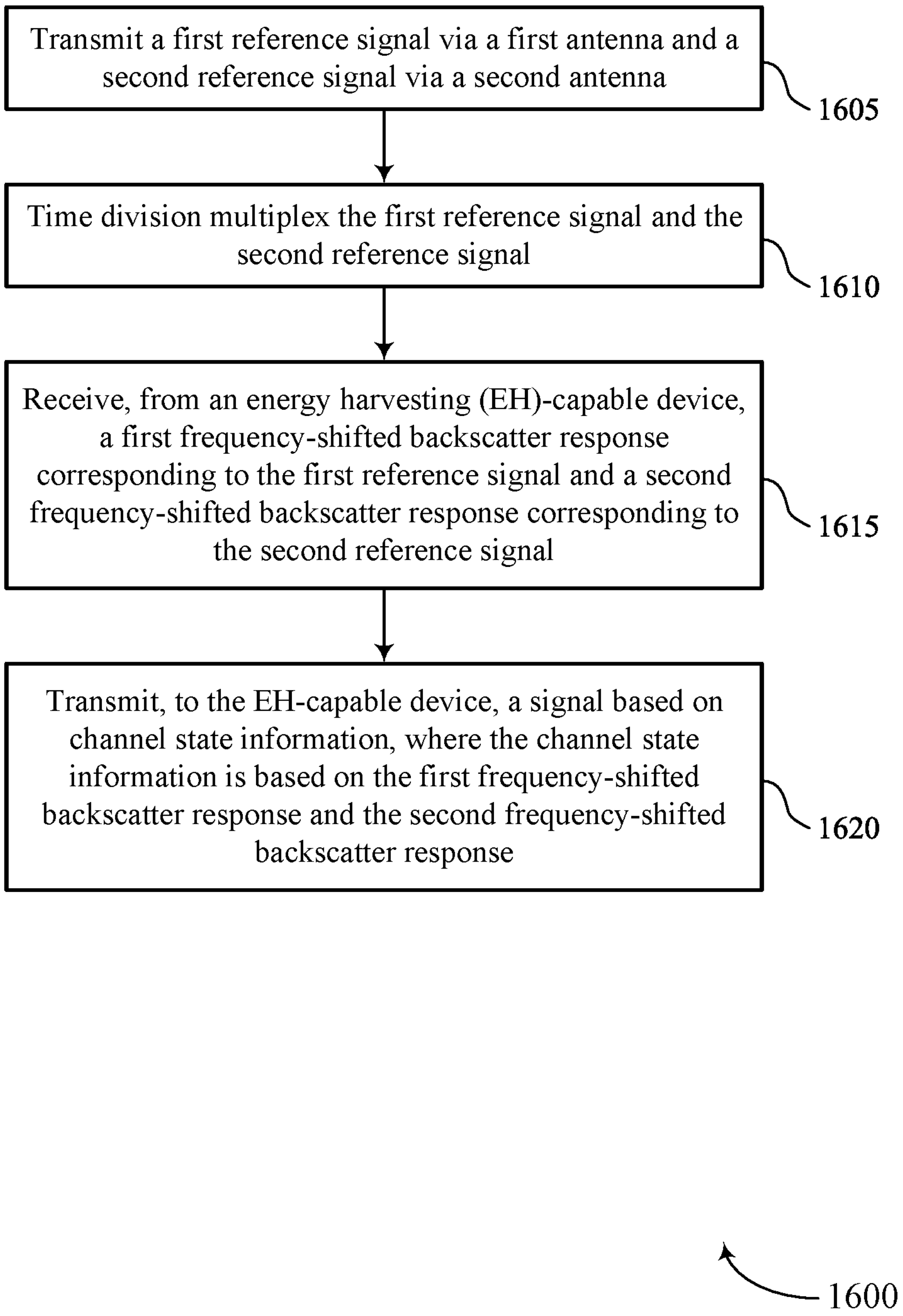

FIG. 16 illustrates a flowchart showing a method 1600 that supports multi-antenna reader CSI acquisition in accordance with one or more aspects of the present disclosure. The operations of the method 1600 may be implemented by a network entity or its components as described herein. For example, the operations of the method 1600 may be performed by a network entity as described with reference to FIGS. 1 through 10. In some aspects, a network entity may execute a set of instructions to control the functional elements of the network entity to perform the described functions. Additionally, or alternatively, the network entity may perform aspects of the described functions using special-purpose hardware.

At 1605, the method may include transmitting a first reference signal via a first antenna and a second reference signal via a second antenna. The operations of 1605 may be performed in accordance with examples as disclosed herein. In some aspects, aspects of the operations of 1605 may be performed by a reference signal manager 925 as described with reference to FIG. 9.

At 1610, the method may include TDMing the first reference signal and the second reference signal. The operations of 1610 may be performed in accordance with examples as disclosed herein. In some aspects, aspects of the operations of 1610 may be performed by a TDM manager 940 as described with reference to FIG. 9.

At 1615, the method may include receiving, from an EH-capable device, a first frequency-shifted backscatter response corresponding to the first reference signal and a second frequency-shifted backscatter response corresponding to the second reference signal. The operations of 1615 may be performed in accordance with examples as disclosed herein. In some aspects, aspects of the operations of 1615 may be performed by a backscatter response manager 930 as described with reference to FIG. 9.

At 1620, the method may include transmitting, to the EH-capable device, a signal based on CSI, where the CSI is based on the first frequency-shifted backscatter response and the second frequency-shifted backscatter response. The operations of 1620 may be performed in accordance with examples as disclosed herein. In some aspects, aspects of the operations of 1620 may be performed by a CSI manager 935 as described with reference to FIG. 9.

Figure 17:
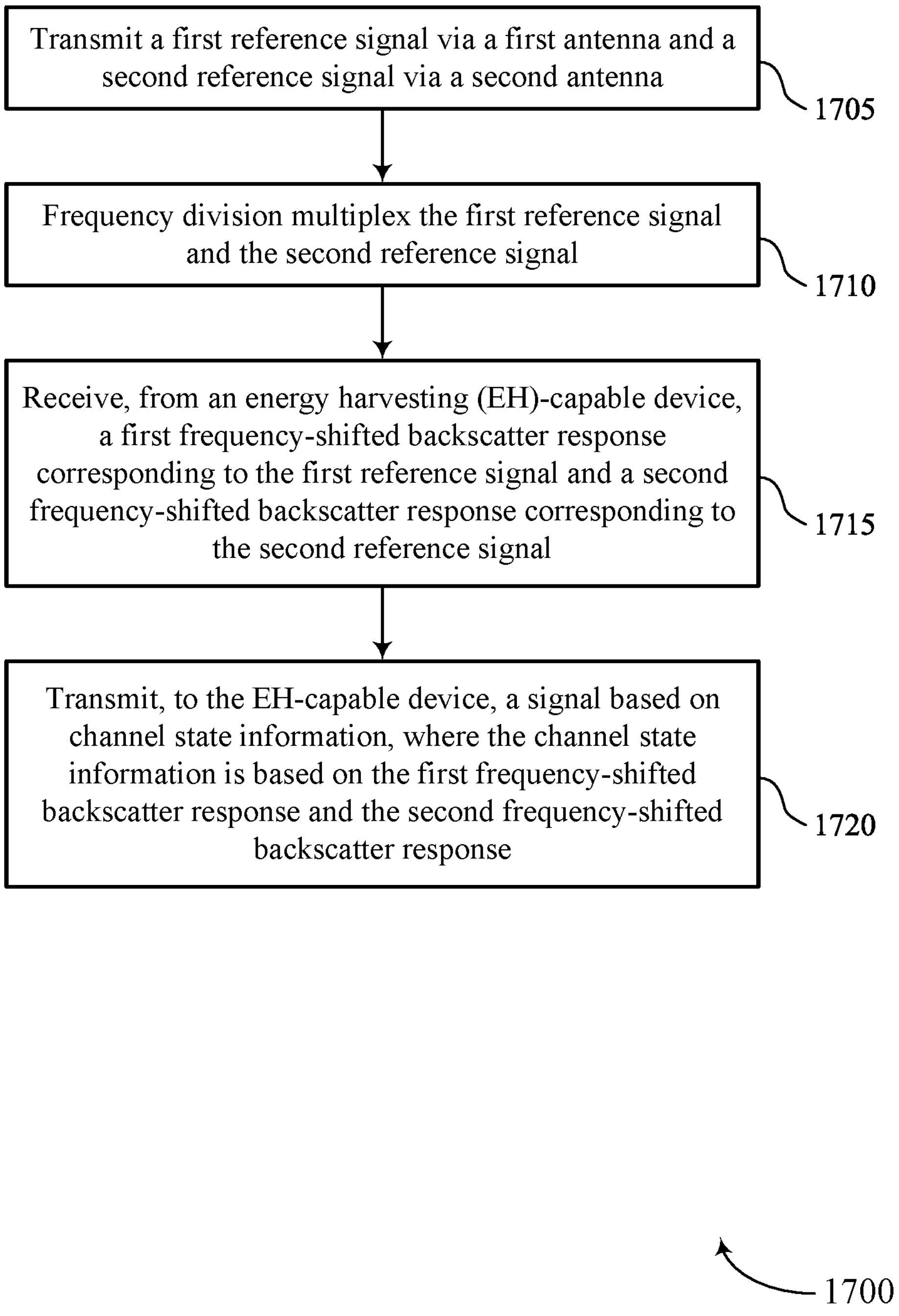

FIG. 17 illustrates a flowchart showing a method 1700 that supports multi-antenna reader CSI acquisition in accordance with one or more aspects of the present disclosure. The operations of the method 1700 may be implemented by a network entity or its components as described herein. For example, the operations of the method 1700 may be performed by a network entity as described with reference to FIGS. 1 through 10. In some aspects, a network entity may execute a set of instructions to control the functional elements of the network entity to perform the described functions. Additionally, or alternatively, the network entity may perform aspects of the described functions using special-purpose hardware.

At 1705, the method may include transmitting a first reference signal via a first antenna and a second reference signal via a second antenna. The operations of 1705 may be performed in accordance with examples as disclosed herein. In some aspects, aspects of the operations of 1705 may be performed by a reference signal manager 925 as described with reference to FIG. 9.

At 1710, the method may include FDMing the first reference signal and the second reference signal. The operations of 1710 may be performed in accordance with examples as disclosed herein. In some aspects, aspects of the operations of 1710 may be performed by an FDM manager 945 as described with reference to FIG. 9.

At 1715, the method may include receiving, from an EH-capable device, a first frequency-shifted backscatter response corresponding to the first reference signal and a second frequency-shifted backscatter response corresponding to the second reference signal. The operations of 1715 may be performed in accordance with examples as disclosed herein. In some aspects, aspects of the operations of 1715 may be performed by a backscatter response manager 930 as described with reference to FIG. 9.

At 1720, the method may include transmitting, to the EH-capable device, a signal based on CSI, where the CSI is based on the first frequency-shifted backscatter response and the second frequency-shifted backscatter response. The operations of 1720 may be performed in accordance with examples as disclosed herein. In some aspects, aspects of the operations of 1720 may be performed by a CSI manager 935 as described with reference to FIG. 9.

Figure 18:
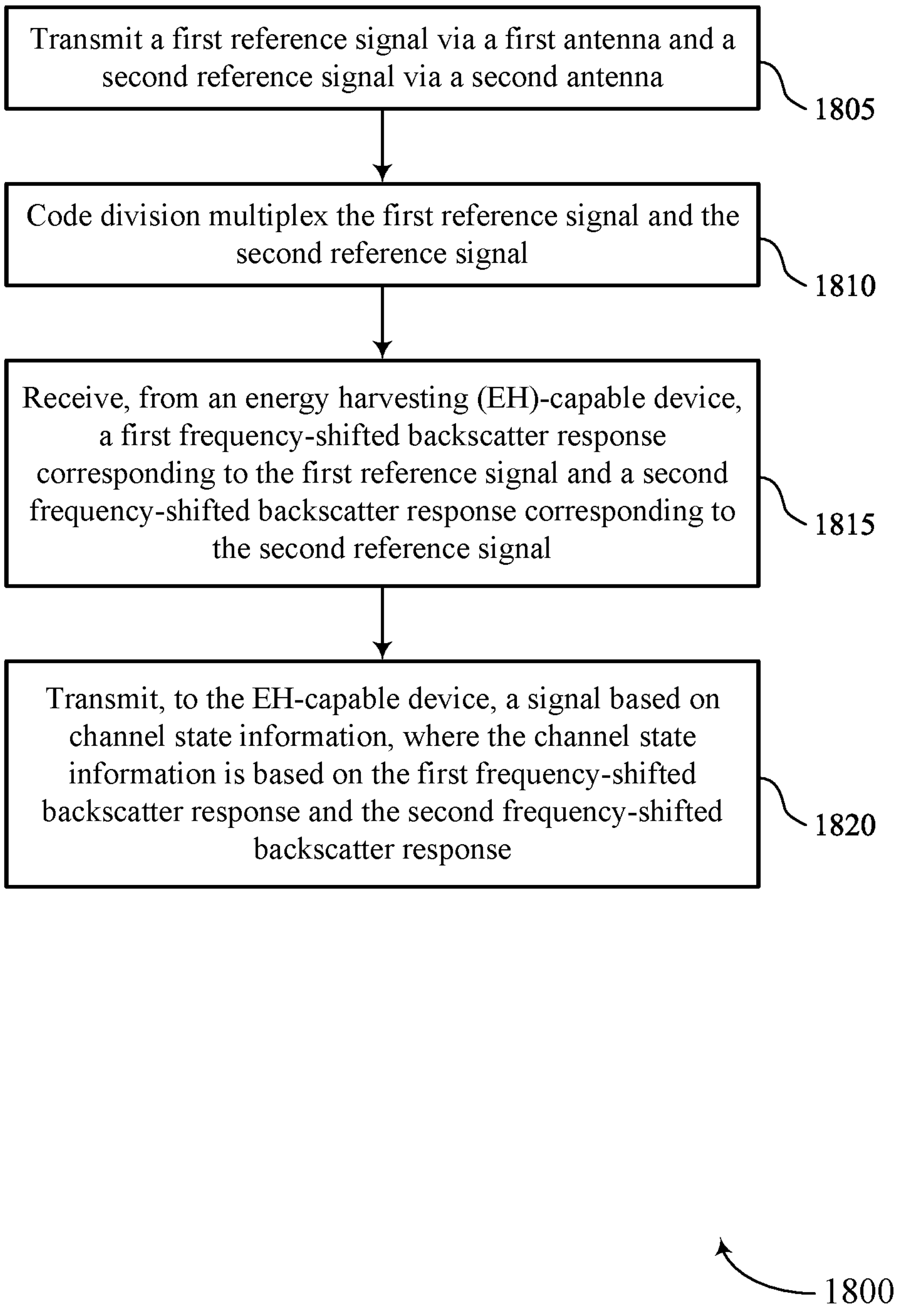

FIG. 18 illustrates a flowchart showing a method 1800 that supports multi-antenna reader CSI acquisition in accordance with one or more aspects of the present disclosure. The operations of the method 1800 may be implemented by a network entity or its components as described herein. For example, the operations of the method 1800 may be performed by a network entity as described with reference to FIGS. 1 through 10. In some aspects, a network entity may execute a set of instructions to control the functional elements of the network entity to perform the described functions. Additionally, or alternatively, the network entity may perform aspects of the described functions using special-purpose hardware.

At 1805, the method may include transmitting a first reference signal via a first antenna and a second reference signal via a second antenna. The operations of 1805 may be performed in accordance with examples as disclosed herein. In some aspects, aspects of the operations of 1805 may be performed by a reference signal manager 925 as described with reference to FIG. 9.

At 1810, the method may include CDMing the first reference signal and the second reference signal. The operations of 1810 may be performed in accordance with examples as disclosed herein. In some aspects, aspects of the operations of 1810 may be performed by a CDM manager 950 as described with reference to FIG. 9.

At 1815, the method may include receiving, from an EH-capable device, a first frequency-shifted backscatter response corresponding to the first reference signal and a second frequency-shifted backscatter response corresponding to the second reference signal. The operations of 1815 may be performed in accordance with examples as disclosed herein. In some aspects, aspects of the operations of 1815 may be performed by a backscatter response manager 930 as described with reference to FIG. 9.

At 1820, the method may include transmitting, to the EH-capable device, a signal based on CSI, where the CSI is based on the first frequency-shifted backscatter response and the second frequency-shifted backscatter response. The operations of 1820 may be performed in accordance with examples as disclosed herein. In some aspects, aspects of the operations of 1820 may be performed by a CSI manager 935 as described with reference to FIG. 9.

Figure 19:
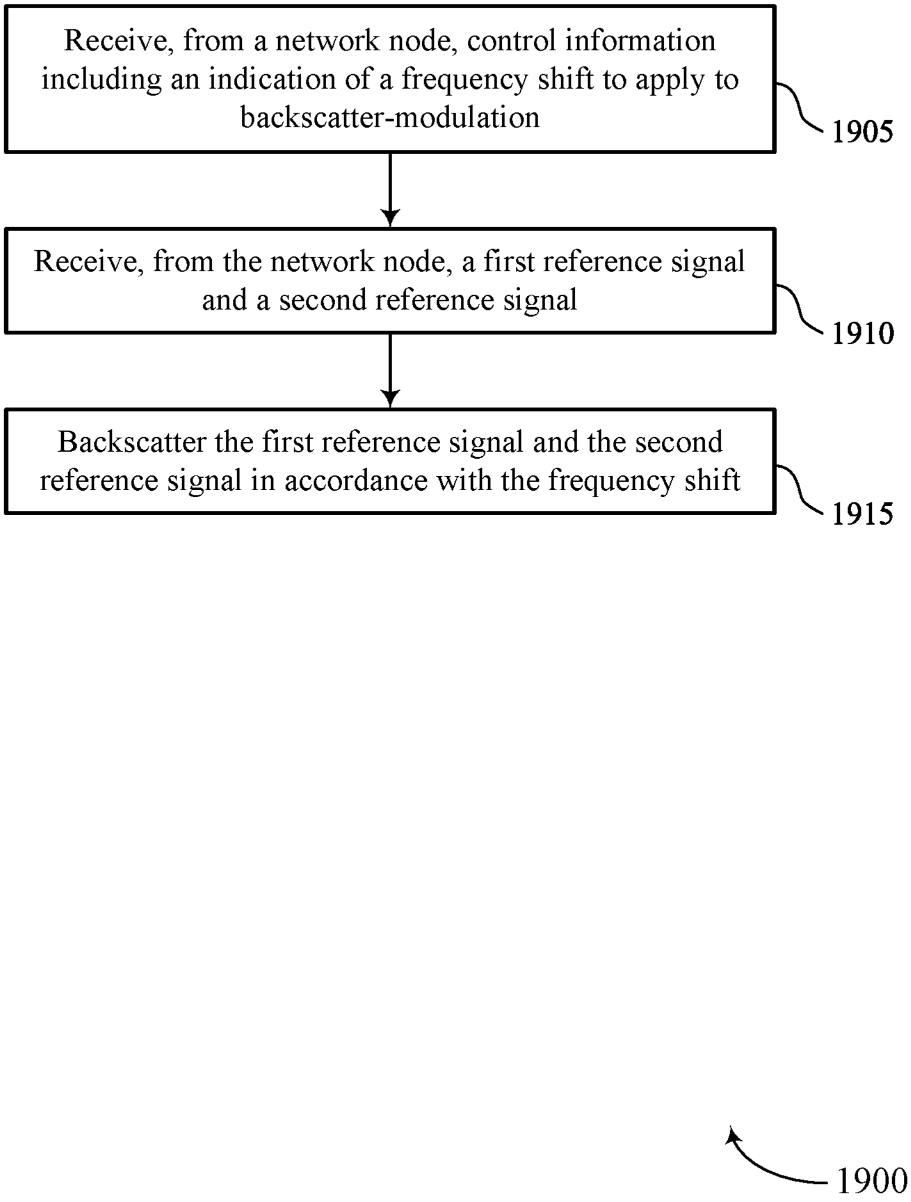

FIG. 19 illustrates a flowchart showing a method 1900 that supports multi-antenna reader CSI acquisition in accordance with one or more aspects of the present disclosure. The operations of the method 1900 may be implemented by a UE or its components as described herein. For example, the operations of the method 1900 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1905, the method may include receiving, from a network node, control information including an indication of a frequency shift to apply to backscatter-modulation. The operations of 1905 may be performed in accordance with examples as disclosed herein. In some examples, aspects of the operations of 1905 may be performed by a frequency shift manager 1325 as described with reference to FIG. 13.

At 1910, the method may include receiving, from the network node, a first reference signal and a second reference signal. The operations of 1910 may be performed in accordance with examples as disclosed herein. In some examples, aspects of the operations of 1910 may be performed by a reference signal manager 1330 as described with reference to FIG. 13.

At 1915, the method may include backscattering the first reference signal and the second reference signal in accordance with the frequency shift. The operations of 1915 may be performed in accordance with examples as disclosed herein. In some examples, aspects of the operations of 1915 may be performed by a backscatter response manager 1335 as described with reference to FIG. 13.

The following provides an overview of aspects of the present disclosure:

Aspect 1: A method for wireless communications at a network node, comprising: transmitting a first reference signal via a first antenna and a second reference signal via a second antenna: receiving, from an EH-capable device, a first frequency-shifted backscatter response corresponding to the first reference signal and a second frequency-shifted backscatter response corresponding to the second reference signal: and transmitting, to the EH-capable device, a signal based on CSI, wherein the CSI is based on the first frequency-shifted backscatter response and the second frequency-shifted backscatter response.

Aspect 2: The method of aspect 1, wherein transmitting the first reference signal via the first antenna and the second reference signal via the second antenna comprises: time division multiplexing the first reference signal and the second reference signal.

Aspect 3: The method of any of aspects 1 through 2, wherein transmitting the first reference signal via the first antenna and the second reference signal via the second antenna comprises: frequency division multiplexing the first reference signal and the second reference signal.

Aspect 4: The method of any of aspects 1 through 3, wherein transmitting the first reference signal via the first antenna and the second reference signal via the second antenna comprises: code division multiplexing the first reference signal and the second reference signal.

Aspect 5: The method of aspect 4, wherein a first precoding vector is associated with the first reference signal and the second reference signal.

Aspect 6: The method of aspect 5, further comprising: transmitting a third reference signal via the first antenna and a fourth reference signal via the second antenna, wherein a second precoding vector is associated with the third reference signal and the fourth reference signal: and receiving, from the EH-capable device, a third frequency-shifted backscatter response corresponding to the third reference signal and a fourth frequency-shifted backscatter response corresponding to the fourth reference signal, wherein the CSI is based on the third frequency-shifted backscatter response and the fourth frequency-shifted backscatter response.

Aspect 7: The method of aspect 6, wherein transmitting the signal based on CSI comprises: transmitting the signal using one of the first precoding vector or the second precoding vector.

Aspect 8: The method of any of aspects 6 through 7, wherein transmitting the signal based on CSI comprises: determining, based on the CSI, a particular precoding vector to use to transmit the signal, wherein the particular precoding vector is one of the first precoding vector or the second precoding vector.

Aspect 9: The method of aspect 8, further comprising: determining the CSI based at least in part on a respective strength for each of the first frequency-shifted backscatter response, the second frequency-shifted backscatter response, the third frequency-shifted backscatter response, and the fourth frequency-shifted backscatter response, wherein determining the particular precoding vector comprises determining the particular precoding vector based on the respective strength for each of the first frequency-shifted backscatter response, the second frequency-shifted backscatter response, the third frequency-shifted backscatter response, and the fourth frequency-shifted backscatter response.

Aspect 10: The method of any of aspects 1 through 9, wherein the CSI includes first CSI based on the first frequency-shifted backscatter response and second CSI based on the second frequency-shifted backscatter response.

Aspect 11: The method of any of aspects 1 through 10, further comprising: transmitting a third reference signal via the first antenna via a second sub-band and a second time resource, wherein transmitting the first reference signal via the first antenna and the second reference signal via the second antenna comprises transmitting the first reference signal via a first sub-band and a first time resource and the second reference signal via the second sub-band and the first time resource: transmitting a fourth reference signal via the second antenna via the first sub-band and the second time resource: and receiving, from the EH-capable device, a third frequency-shifted backscatter response corresponding to the third reference signal and a fourth frequency-shifted backscatter response corresponding to the fourth reference signal, wherein the CSI is based on the third frequency-shifted backscatter response and the fourth frequency-shifted backscatter response.

Aspect 12: The method of aspect 11, further comprising: transmitting, to the EH-capable device, control information that is indicative of a first frequency shift to apply to the first sub-band and to the second sub-band during the first time resource and a second frequency shift to apply to the first sub-band and to the second sub-band during the second time resource, wherein the first frequency-shifted backscatter response and the second frequency-shifted backscatter response are received in accordance with the first frequency shift, and wherein the third frequency-shifted backscatter response and the fourth frequency-shifted backscatter response are received in accordance with the second frequency shift.

Aspect 13: The method of any of aspects 1 through 11, further comprising: transmitting, to the EH-capable device, control information that is indicative of a frequency shift to be applied to the first reference signal and the second reference signal, wherein receipt of the first frequency-shifted backscatter response and the second frequency-shifted backscatter response is in accordance with the frequency shift.

Aspect 14: The method of aspect 13, further comprising: transmitting, to a second EH-capable device, second control information that is indicative of a second frequency shift to be applied to the first reference signal and the second reference signal: receiving, from the second EH-capable device, a third frequency-shifted backscatter response corresponding to the first reference signal and a fourth frequency-shifted backscatter response corresponding to the second reference signal, wherein receipt of the third frequency-shifted backscatter response and the fourth frequency-shifted backscatter response is in accordance with the second frequency shift: and transmitting, to the second EH-capable device, a second signal based on second CSI, wherein the second CSI is based on the third frequency-shifted backscatter response and the fourth frequency-shifted backscatter response.

Aspect 15: The method of any of aspects 1 through 14, wherein the control information is indicative of an identifier for the EH-capable device.

Aspect 16: The method of any of aspects 1 through 15, further comprising: selecting a first beam associated with the first reference signal based on the CSI, wherein the second reference signal is associated with the second reference signal, and wherein transmission of the signal is via the beam.

Aspect 17: The method of any of aspects 1 through 16, further comprising: transmitting, to the EH-capable device, control information indicating for the EH-capable device to apply a same reflection coefficient to the first reference signal and the second reference signal, wherein the CSI is based on the same reflection coefficient.

Aspect 18: A method for wireless communications at an EH-capable device, comprising: receiving, from a network node, control information including an indication of a frequency shift to apply to backscatter-modulation: receiving, from the network node, a first reference signal and a second reference signal; and backscattering the first reference signal and the second reference signal in accordance with the frequency shift.

Aspect 19: The method of aspect 18, wherein the indication is indicative of a same frequency shift to apply to the first reference signal and the second reference signal.

Aspect 20: The method of aspect 18, further comprising: receiving the first reference signal via a first sub-band and the second reference signal via a second sub-band, wherein the indication is indicative of a first frequency shift to apply to reference signals received via a first sub-band and a second frequency shift to apply to reference signals received via a second sub-band.

Aspect 21: The method of any of aspects 18 through 20, wherein receiving the control information comprises: receiving an identifier for the EH-capable device.

Aspect 22: The method of any of aspects 18 through 21, wherein receiving the control information comprises: receiving an indication to apply a same reflection coefficient to the first reference signal and the second reference signal.

Aspect 23: The method of any of aspects 18 through 22, further comprising: receiving, from the network node, a signal based on the backscattered first reference signal and the backscattered second reference signal.

Aspect 24: A network node for wireless communication, comprising: a memory: and at least one processor coupled to the memory, wherein the at least one processor is configured to perform a method of any of aspects 1 through 17.

Aspect 25: An apparatus for wireless communications at a network node, comprising at least one means for performing a method of any of aspects 1 through 17.

Aspect 26: A non-transitory computer-readable medium storing code for wireless communications at a network node, the code comprising instructions executable by a processor to perform a method of any of aspects 1 through 17.

Aspect 27: An EH-capable device, comprising: a memory: and at least one processor coupled to the memory, wherein the at least one processor is configured to perform a method of any of aspects 18 through 23.

Aspect 28: An apparatus for wireless communications at an EH-capable device, comprising at least one means for performing a method of any of aspects 18 through 23.

Aspect 29: A non-transitory computer-readable medium storing code for wireless communications at an EH-capable device, the code comprising instructions executable by a processor to perform a method of any of aspects 18 through 23.

The methods described herein describe possible implementations, and the operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer.

By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network node for wireless communication, comprising:

a memory; and at least one processor coupled to the memory, wherein the at least one processor is configured to:

transmit a first reference signal via a first antenna and a second reference signal via a second antenna, wherein a first precoding vector is associated with both the first reference signal and the second reference signal;

receive, from an energy harvesting (EH)-capable device, a first frequency-shifted backscatter response corresponding to the first reference signal and a second frequency-shifted backscatter response corresponding to the second reference signal, wherein the first frequency-shifted backscatter response and the second frequency-shifted backscatter response are based on the first precoding vector; and transmit, to the EH-capable device, a signal based on channel state information, wherein the channel state information is based on the first frequency-shifted backscatter response and the second frequency-shifted backscatter response.

2. The network node of claim 1, wherein, to transmit the first reference signal via the first antenna and the second reference signal via the second antenna, the at least one processor is configured to time division multiplex the first reference signal and the second reference signal.

3. The network node of claim 1, wherein, to transmit the first reference signal via the first antenna and the second reference signal via the second antenna, the at least one processor is configured to frequency division multiplex the first reference signal and the second reference signal.

4. The network node of claim 1, wherein, to transmit the first reference signal via the first antenna and the second reference signal via the second antenna, the at least one processor is configured to code division multiplex the first reference signal and the second reference signal.

5. The network node of claim 1, wherein the at least one processor is configured to:

transmit a third reference signal via the first antenna and a fourth reference signal via the second antenna, wherein a second precoding vector is associated with the third reference signal and the fourth reference signal; and receive, from the EH-capable device, a third frequency-shifted backscatter response corresponding to the third reference signal and a fourth frequency-shifted backscatter response corresponding to the fourth reference signal, wherein the channel state information is based on the third frequency-shifted backscatter response and the fourth frequency-shifted backscatter response.

6. The network node of claim 5, wherein, to transmit the signal based on the channel state information, the at least one processor is configured to transmit the signal using one of the first precoding vector or the second precoding vector.

7. The network node of claim 5, wherein, to transmit the signal based on the channel state information, the at least one processor is configured to determine, based on the channel state information, a particular precoding vector to use to transmit the signal, wherein the particular precoding vector is one of the first precoding vector or the second precoding vector.

8. The network node of claim 7, wherein the at least one processor is configured to:

determine the channel state information based at least in part on a respective strength for each of the first frequency-shifted backscatter response, the second frequency-shifted backscatter response, the third frequency-shifted backscatter response, and the fourth frequency-shifted backscatter response, wherein to determine the particular precoding vector, the at least one processor is configured to determine the particular precoding vector based on the respective strength for each of the first frequency-shifted backscatter response, the second frequency-shifted backscatter response, the third frequency-shifted backscatter response, and the fourth frequency-shifted backscatter response.

9. The network node of claim 1, wherein the channel state information includes first channel state information based on the first frequency-shifted backscatter response and second channel state information based on the second frequency-shifted backscatter response.

10. The network node of claim 1, wherein, to transmit the first reference signal via the first antenna and the second reference signal via the second antenna, the at least one processor is configured to transmit the first reference signal via a first sub-band and a first time resource and the second reference signal via a second sub-band and the first time resource, and wherein the at least one processor is further configured to:

transmit a third reference signal via the first antenna via the second sub-band and a second time resource;

transmit a fourth reference signal via the second antenna via the first sub-band and the second time resource; and receive, from the EH-capable device, a third frequency-shifted backscatter response corresponding to the third reference signal and a fourth frequency-shifted backscatter response corresponding to the fourth reference signal, wherein the channel state information is based on the third frequency-shifted backscatter response and the fourth frequency-shifted backscatter response.

11. The network node of claim 10, wherein the at least one processor is further configured to:

transmit, to the EH-capable device, control information that is indicative of a first frequency shift to apply to the first sub-band and to the second sub-band during the first time resource and a second frequency shift to apply to the first sub-band and to the second sub-band during the second time resource, wherein the first frequency-shifted backscatter response and the second frequency-shifted backscatter response are received in accordance with the first frequency shift, and wherein the third frequency-shifted backscatter response and the fourth frequency-shifted backscatter response are received in accordance with the second frequency shift.

12. The network node of claim 1, wherein the at least one processor is further configured to:

transmit, to the EH-capable device, control information that is indicative of a frequency shift to be applied to the first reference signal and the second reference signal, wherein receipt of the first frequency-shifted backscatter response and the second frequency-shifted backscatter response is in accordance with the frequency shift.

13. The network node of claim 12, wherein the at least one processor is further configured to:

transmit, to a second EH-capable device, second control information that is indicative of a second frequency shift to be applied to the first reference signal and the second reference signal;

receive, from the second EH-capable device, a third frequency-shifted backscatter response corresponding to the first reference signal and a fourth frequency-shifted backscatter response corresponding to the second reference signal, wherein receipt of the third frequency-shifted backscatter response and the fourth frequency-shifted backscatter response is in accordance with the second frequency shift; and transmit, to the second EH-capable device, a second signal based on second channel state information, wherein the second channel state information is based on the third frequency-shifted backscatter response and the fourth frequency-shifted backscatter response.

14. The network node of claim 12, wherein the control information is indicative of an identifier for the EH-capable device.

15. The network node of claim 1, wherein the at least one processor is further configured to:

select a first beam associated with the first reference signal based on the channel state information, wherein the second reference signal is associated with a second beam, and wherein transmission of the signal is via the first beam.

16. The network node of claim 1, wherein the at least one processor is further configured to:

transmit, to the EH-capable device, control information indicating for the EH-capable device to apply a same reflection coefficient to the first reference signal and the second reference signal, wherein the channel state information is based on the same reflection coefficient.

17. An energy harvesting (EH)-capable device comprising:

a memory; and at least one processor coupled to the memory, wherein the at least one processor is configured to:

receive, from a network node, control information including an indication of a frequency shift to apply to backscatter-modulation;

receive, from the network node, a first reference signal and a second reference signal, wherein a first precoding vector is associated with both the first reference signal and the second reference signal; and backscatter the first reference signal and the second reference signal in accordance with the frequency shift, wherein the backscattered first reference signal and the backscattered second reference signal are based on the first precoding vector.

18. The EH-capable device of claim 17, wherein the indication is indicative of a same frequency shift to apply to the first reference signal and the second reference signal.

19. The EH-capable device of claim 17, wherein the indication is indicative of a first frequency shift to apply to reference signals received via a first sub-band and a second frequency shift to apply to reference signals received via a second sub-band, and wherein the first reference signal is received via the first sub-band and the second reference signal is received via the second sub-band.

20. The EH-capable device of claim 17, wherein the control information includes an identifier for the EH-capable device.

21. The EH-capable device of claim 17, wherein the control information includes a second indication to apply a same reflection coefficient to the first reference signal and the second reference signal.

22. The EH-capable device of claim 17, wherein the at least one processor is further configured to:

receive, from the network node, a signal based on the backscattered first reference signal and the backscattered second reference signal.

23. A method for wireless communications at a network node, comprising:

transmitting a first reference signal via a first antenna and a second reference signal via a second antenna, wherein a first precoding vector is associated with both the first reference signal and the second reference signal;

receiving, from an energy harvesting (EH)-capable device, a first frequency-shifted backscatter response corresponding to the first reference signal and a second frequency-shifted backscatter response corresponding to the second reference signal, wherein the first frequency-shifted backscatter response and the second frequency-shifted backscatter response are based on the first precoding vector; and transmitting, to the EH-capable device, a signal based on channel state information, wherein the channel state information is based on the first frequency-shifted backscatter response and the second frequency-shifted backscatter response.

24. The method of claim 23, wherein transmitting the first reference signal via the first antenna and the second reference signal via the second antenna comprises:

time division multiplexing the first reference signal and the second reference signal.

25. The method of claim 23, wherein transmitting the first reference signal via the first antenna and the second reference signal via the second antenna comprises:

frequency division multiplexing the first reference signal and the second reference signal.

26. The method of claim 23, wherein transmitting the first reference signal via the first antenna and the second reference signal via the second antenna comprises:

code division multiplexing the first reference signal and the second reference signal.

27. The method of claim 23, further comprising:

transmitting a third reference signal via the first antenna and a fourth reference signal via the second antenna, wherein a second precoding vector is associated with the third reference signal and the fourth reference signal; and receiving, from the EH-capable device, a third frequency-shifted backscatter response corresponding to the third reference signal and a fourth frequency-shifted backscatter response corresponding to the fourth reference signal, wherein the channel state information is based on the third frequency-shifted backscatter response and the fourth frequency-shifted backscatter response.

28. A method for wireless communications at an energy harvesting (EH)-capable device, comprising:

receiving, from a network node, control information including an indication of a frequency shift to apply to backscatter-modulation;

receiving, from the network node, a first reference signal and a second reference signal, wherein a first precoding vector is associated with both the first reference signal and the second reference signal; and backscattering the first reference signal and the second reference signal in accordance with the frequency shift, wherein the backscattered first reference signal and the backscattered second reference signal are based on the first precoding vector.

* * * * *